(12) United States Patent
Bleus et al.

(10) Patent No.: US 12,077,670 B2
(45) Date of Patent: Sep. 3, 2024

(54) COATED INSULATION MATERIAL SUBSTRATE

(71) Applicant: PITTSBURGH CORNING EUROPE NV, Tessenderlo (BE)

(72) Inventors: Els Bleus, Turnhout (BE); Ellen Kuppens, Mol (BE); Kate Ranieri, Deurne (BE); Piet Vitse, Herent-Winksele (BE); Remco Visseren, Eijsden (NL); Gere Kattenbeld, Eijsden (NL); Joris Van Der Eerden, Eijsden (NL)

(73) Assignee: PITTSBURGH CORNING EUROPE NV, Tessenderlo (BE)

( * ) Notice: Subject to any disclaimer, the term of this patent is extended or adjusted under 35 U.S.C. 154(b) by 609 days.

(21) Appl. No.: 17/276,556

(22) PCT Filed: Sep. 16, 2019

(86) PCT No.: PCT/EP2019/074755
§ 371 (c)(1),
(2) Date: Mar. 16, 2021

(87) PCT Pub. No.: WO2020/058211
PCT Pub. Date: Mar. 26, 2020

(65) Prior Publication Data
US 2022/0049106 A1 Feb. 17, 2022

(30) Foreign Application Priority Data

Sep. 18, 2018 (EP) ..................................... 18195314

(51) Int. Cl.
*C09D 1/04* (2006.01)
*C03C 11/00* (2006.01)
(Continued)

(52) U.S. Cl.
CPC ................ *C09D 1/04* (2013.01); *C03C 11/00* (2013.01); *C03C 17/22* (2013.01); *C09D 7/61* (2018.01);
(Continued)

(58) Field of Classification Search
None
See application file for complete search history.

(56) References Cited

U.S. PATENT DOCUMENTS 3,930,876 A   1/1976 Nakajima et al.
3,957,519 A   5/1976 Linton
(Continued)

FOREIGN PATENT DOCUMENTS

CN    107949610 A    4/2018
WO    2014016518 A1  1/2014

OTHER PUBLICATIONS

Office Action from CA Application No. 3,112,487 dated Aug. 21, 2023.
(Continued)

*Primary Examiner* — Chinessa T. Golden
(74) *Attorney, Agent, or Firm* — Calfee, Halter & Griswold LLP

(57) ABSTRACT

A coated insulation material comprising an insulation material substrate and a coating on at least part of a surface of the insulation material substrate and wherein the coating comprises 20 to 65 wt % alkali silicate based on the total weight of the cured coating and the alkali silicate comprises potassium silicate. Also described is an aqueous coating composition useful in providing the insulation material coating, a potassium silicate coating, methods of producing the coated insulation material and potassium silicate coating and kit of
(Continued)

parts including an insulation material substrate and either the aqueous coating composition or the potassium silicate coating.

18 Claims, 1 Drawing Sheet

(51) Int. Cl.
    *C03C 17/22*     (2006.01)
    *C09D 7/61*     (2018.01)
    *E04B 1/80*     (2006.01)

(52) U.S. Cl.
    CPC .......... *E04B 1/806* (2013.01); *C03C 2217/78* (2013.01); *C03C 2218/11* (2013.01); *C03C 2218/32* (2013.01)

(56) References Cited

U.S. PATENT DOCUMENTS

| | | |
|---|---|---|
| 3,957,520 A | 5/1976 | Linton |
| 4,347,285 A | 8/1982 | Batdorf |
| 2002/0034650 A1 | 3/2002 | Neely, Jr. |
| 2008/0145548 A1 | 6/2008 | Bracher |
| 2015/0175480 A1* | 6/2015 | Clabau .................... C03C 17/22 |
| | | 427/397.8 |

OTHER PUBLICATIONS

Extended European Search Report from EP Application No. 18195314.2 dated Mar. 1, 2019.
International Search Report and Written Opinion from PCT/EP2019/074755 dated Nov. 14, 2019.

* cited by examiner

COATED INSULATION MATERIAL SUBSTRATE

CROSS-REFERENCE TO RELATED APPLICATIONS

This application is the U.S. national stage entry of International Application No. PCT/EP2019/074755, filed Sep. 16, 2019, which claims priority to and the benefit of European Application No. 18195314.2, filed Sep. 18, 2018, the entire contents of which are incorporated by reference herein.

FIELD OF THE INVENTION

The present invention relates to insulation material substrates coated in an alkali silicate coating and particularly, although not exclusively, to cellular glass insulation materials coated in cured alkali silicate coating.

BACKGROUND

Insulating panels are widely used in the building industry to provide insulation, such as thermal insulation, acoustic insulation. Insulation panels are also used to provide insulation for industrial apparatus, such as pipes and storage containers.

Examples of insulating panels include cellular glass panels. Panels of cellular glass material (e.g. of the type available under the Trade Mark Foamglas®) are well-known as a lightweight, rigid, durable insulation material that has a good compressive strength. Cellular glass material is used to provide thermal insulation for a wide range of applications such as insulating walls, roofs and floors of a building as well as industrial applications such as insulating pipes and tanks.

For various insulating material applications, it is advantageous to provide a coating on a surface of the insulating material. Such a coating may protect the material, for example to improve weather resistance where cellular glass panels are located on the exterior of a building. Additionally or alternatively, such a coating may contribute to fire resistance and/or the material's reaction to fire. The fire testing and classification standards for construction products have been harmonized in the EU in European Standard EN 13501-1. The European Reaction to Fire classification system (Euro classes) is the EU common standard for assessing the qualities of building materials in the event of a fire, and covers three elements: a class based on combustibility and contribution to fire; a sub-class based on total smoke propagation/emission level; and a sub-class based on the amount of flaming droplets and particles when the material is exposed to fire.

In addition to the properties (such as water resistance or reaction to fire) of the resulting coating, the compatibility of the coating with the insulating material substrate should also be considered when selecting a coating for insulating materials. It is desirable that any coating sufficiently adheres to the surface of the insulating material substrate so that the coating does not easily deform or shear from the substrate. In some circumstances, a poorly adhering coating may be prone to delaminate from substrate surface.

It is therefore desirable to provide a coated insulating material with a coating having one or more of improved adhesion, improved water resistance, and improved reaction to fire.

The present invention has been devised in light of the above considerations.

SUMMARY OF THE INVENTION

The present invention provides insulation materials including potassium silicate coatings and coating compositions for use in forming potassium silicate coatings that may be applied to an insulation material substrate to provide a potassium silicate coating thereon. Potassium silicate coatings of the invention (and optionally their precursor aqueous coating compositions) may be able to bind to insulating material and particularly cellular glass material to provide adhesive potassium silicate coatings thereon. Embodiments of the invention provide suitable adhesion and/or water resistance and/or reaction to fire. In a particular, coatings of the invention may contribute to a good fire reaction classification (as defined herein). Such good fire reaction classification may be provided, at least in part by including a particulate material in the coating that displays fire resistance.

At its most general, the present invention provides a coated insulation material comprising an insulation material substrate and an alkali silicate coating, wherein the alkali silicate coating includes potassium silicate. The present invention also provides an aqueous coating composition comprising alkali silicate and a curing agent, wherein the alkali silicate comprises potassium silicate. Such compositions may be applied to a surface of an insulation material substrate and cured to form a coated insulation material as described herein. The present invention also provides building materials including the coated insulation material as described herein.

In a first aspect, the present invention provides a coated insulation material comprising an insulation material substrate and a coating on at least part of a surface of the insulation material substrate, and wherein the coating comprises 20 to 65 wt. % alkali silicate based on the total weight of the cured coating and the alkali silicate comprises potassium silicate. In particular embodiments, the coating includes 20 to 65 wt. % alkali silicate comprising potassium silicate and lithium silicate.

Such a coated insulation material provides an insulation material substrate with a potassium silicate coating having desirable properties, such as one or more of good coating-substrate adhesion, good water resistance and good fire reaction classification.

In a second aspect, the present invention provides a coated insulation material comprising an insulation material substrate and a coating on at least part of a surface of the insulation material substrate and wherein the coating is formed by curing an aqueous coating composition comprising alkali silicate and a curing agent, wherein the aqueous coating composition comprises:
(a) 10 to 40 wt. % of the alkali silicate, the alkali silicate comprising potassium silicate; and
(b) 15 to 60 wt. % of the curing agent; and
(c) at least 15 wt. % of water;
 Wherein the % weight amounts are based on the total weight of the aqueous coating composition.

In a particular embodiment, the aqueous coating composition of the second aspect comprises:
(a) 10 to 40% by weight of an alkali silicate comprising potassium silicate and lithium silicate in amounts of
 5 to 15% by weight of $K_2O$;
 0.01 to 1% by weight $Li_2O$; and
 5 to 25% by weight of $SiO_2$;

and the weight ratio of $SiO_2$ to $K_2O$ is at least 1; and
(b) 15 to 60% by weight of a curing agent; and
(c) 0.1 to 15% by weight of one or more compounds of Formula 1

$$R(OH)_n \qquad \text{Formula 1}$$

wherein
R denotes an optionally substituted $C_{2-6}$ hydrocarbyl or $C_{2-6}$ carbohydrate moiety and n is an integer from 1 to 6; and
(d) 0.02 to 0.8% by weight of surfactant relative to the total weight of the composition; and
(e) at least 15% by weight of water;
wherein the % wt amounts are based on the total weight of the aqueous coating composition.

The aqueous coating composition may further comprise a particulate filler material, optionally wherein the particulate filler material is present in an amount of from 20 to 30 wt % relative to the total weight of the composition.

In a particular embodiment, the aqueous coating composition of the second aspect comprises:
(a) 10 to 25% by weight of a silicate component comprising potassium silicate and lithium silicate in amounts of:
  5 to 10% by weight of $K_2O$;
  0.01 to 0.5% by weight $Li_2O$; and
  5 to 15% by weight of $SiO_2$;
  and the weight ratio of $SiO_2$ to $K_2O$ is at least 1,
(b) 20 to 50% by weight of a curing agent,
(c) 0.1 to 10% by weight of one or more compounds of Formula 1

$$R(OH)_n \qquad \text{Formula 1}$$

wherein
R denotes an optionally substituted $C_{2-6}$ hydrocarbyl or $C_{2-6}$ carbohydrate moiety and n is an integer from 1 to 6;
(d) 0.01 to 0.5% by weight of surfactant relative to the total weight of the composition; and
(e) at least 15% by weight of water; and
(f) 20 to 30% by weight of a particulate filler material,
wherein all % by weight amounts specified are relative to the total weight of the composition.

In a third aspect, the present invention provides a coated insulation material substrate comprising an insulation material substrate having a substantially closed cell structure, and whereby at least one of the surfaces of the insulation material substrate is at least partially provided with a coating, whereby the coating comprises an alkali silicate, a curing agent and a particulate filler material, whereby the particulate filler material has a thermal expansion coefficient in the range of 50-150% of the thermal expansion coefficient of the cell wall material of the insulation material, whereby the particulate filler material has a bulk density of at least 0.30 kg/dm³, and whereby the coating, when heated from room temperature up to a temperature of at least 200° C. exhibits a volumetric expansion of at most 50%.

In a fourth aspect, the present invention provides an aqueous coating composition comprising:
(a) 10 to 40% by weight of an alkali silicate comprising potassium silicate and lithium silicate in amounts of
  5 to 15% by weight of $K_2O$;
  0.01 to 1% by weight of $Li_2O$; and
  5 to 25% by weight of $SiO_2$;
  and the weight ratio of $SiO_2$ to $K_2O$ is at least 1; and
(b) 15 to 60% by weight of a curing agent; and
(c) 0.1 to 15% by weight of one or more compounds of Formula 1

$$R(OH)_n \qquad \text{Formula 1}$$

wherein
R denotes an optionally substituted $C_{2-6}$ hydrocarbyl or $C_{2-6}$ carbohydrate moiety and n is an integer from 1 to 6; and
(d) 0.02 to 0.8% by weight of surfactant relative to the total weight of the composition; and
(e) at least 15% by weight of water;
wherein the % wt amounts are based on the total weight of the aqueous coating composition.

In a particular embodiment, the aqueous coating composition of the fourth aspect comprises:
(a) 16 to 36% by weight of an alkali silicate comprising potassium silicate and lithium silicate in amounts of
  8 to 15% by weight of $K_2O$;
  0.02 to 0.8% by weight $Li_2O$; and
  8 to 20% by weight of $SiO_2$;
  and the weight ratio of $SiO_2$ to $K_2O$ is at least 1; and
(b) 20 to 50% by weight of a curing agent; and
(c) 0.2 to 15% by weight of one or more compounds of Formula 1

$$R(OH)_n \qquad \text{Formula 1}$$

wherein
R denotes an optionally substituted $C_{2-6}$ hydrocarbyl or $C_{2-6}$ carbohydrate moiety and n is an integer from 1 to 6; and
(d) 0.02 to 0.8% by weight of surfactant relative to the total weight of the composition; and
(e) at least 15% by weight of water;
wherein the % wt amounts are relative to the total weight of components (a) to (e).

The aqueous coating composition may further comprise a particulate filler material, optionally wherein the particulate filler material is present in an amount of from 20 to 30 wt % relative to the total weight of the composition.

The aqueous coating compositions according to the fourth aspect of the invention may comprise:
(a) 10 to 25% by weight of alkali silicate comprising potassium silicate and lithium silicate in amounts of:
  5 to 10% by weight of $K_2O$;
  0.01 to 0.5% by weight $Li_2O$; and
  5 to 15% by weight of $SiO_2$;
  and the weight ratio of $SiO_2$ to $K_2O$ is at least 1,
(b) 20 to 50% by weight of a curing agent,
(c) 0.1 to 10% by weight of one or more compounds of Formula 1

$$R(OH)_n \qquad \text{Formula 1}$$

wherein
R denotes an optionally substituted $C_{2-6}$ hydrocarbyl or $C_{2-6}$ carbohydrate moiety and n is an integer from 1 to 6;
(d) 0.01 to 0.5% by weight of surfactant relative to the total weight of the composition; and
(e) at least 15% by weight of water; and
(f) 20 to 30% by weight of a particulate filler material,
wherein all % by weight amounts specified are relative to the total weight of the composition.

The aqueous coating compositions of the second to fourth aspects include a curing agent. As such, the compositions are typically curable or capable of being cured. Curing and curing conditions are readily known to the person skilled in the art.

In a fifth aspect, the present invention provides a potassium silicate coating formed by curing the aqueous coating composition of the fourth aspect.

In a sixth aspect, the present invention provides a potassium silicate coating comprising:
(a) 20 to 65% by weight of an alkali silicate comprising potassium silicate and lithium silicate in amounts of:
    10 to 32% by weight of $K_2O$;
    0.05 to 1% by weight $Li_2O$; and
    10 to 32% by weight of $SiO_2$;
    and the weight ratio of $SiO_2$ to $K_2O$ is at least 1; and
(b) optionally 20 to 30% by weight of a particulate filler material,
where all % by amounts are based on the total weight of the potassium silicate coating.

In a seventh aspect, the present invention provides a kit for providing a coated insulation material substrate, the kit comprising at least one insulation material substrate to be coated and an aqueous coating composition in sufficient quantity to provide a coating on at least part of one surface of the insulation material substrate, the aqueous coating composition comprises:
(a) 10 to 40 wt. % of the alkali silicate, the alkali silicate comprising potassium silicate;
(b) 15 to 60 wt. % of the curing agent; and
(c) at least 15 wt. % of water;
    Wherein the % weight amounts are based on the total weight of the aqueous coating composition.

In particular embodiments of the seventh aspect, the kit includes the aqueous coating composition according to the fourth aspect.

In an eighth aspect, the present invention provides a kit for providing a coated insulation material substrate, the kit comprising at least one insulation material substrate to be coated and a potassium silicate coating in sufficient quantity to provide a coating on at least one surface of the insulation material substrate, the potassium silicate coating being the potassium silicate coating according to the fifth aspect, the sixth aspect or is formed by curing an aqueous coating composition comprising according to any aspect or embodiment described herein.

In a ninth aspect, the present invention provides a method of curing the aqueous coating composition of the fourth aspect, the method comprising the steps of:
(i) Providing an aqueous coating composition of the fourth aspect; and
(ii) Initiating curing of the composition to form a potassium silicate coating.

In a tenth aspect, the present invention provides a method of producing a coated insulation material substrate, the method comprising the steps of:
(i) Providing an aqueous coating compositions according to any aspect or embodiment as described herein;
(ii) Applying the composition to at least one surface of an insulation material substrate; and
(iii) initiating curing of the composition.

Steps (ii) and (iii) of the tenth aspect may be performed sequentially or simultaneously.

In an eleventh aspect, the present invention provides a method of producing a coated insulation material substrate, the method comprising the steps of:
(i) Providing an aqueous coating composition according to any aspect or embodiment as described herein;
(ii) initiating curing of the composition to form a potassium silicate coating; and then
(iii) applying the potassium silicate coating to at least one surface of an insulation material substrate.

In a further aspect, the present invention provides a building material comprising a coated insulation material substrate according to any one of the first to third aspects of the present invention or a coated insulation material substrate obtained by or obtainable by the methods of the tenth or eleventh aspects.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which.

DETAILED DESCRIPTION OF THE INVENTION

Figure 1:
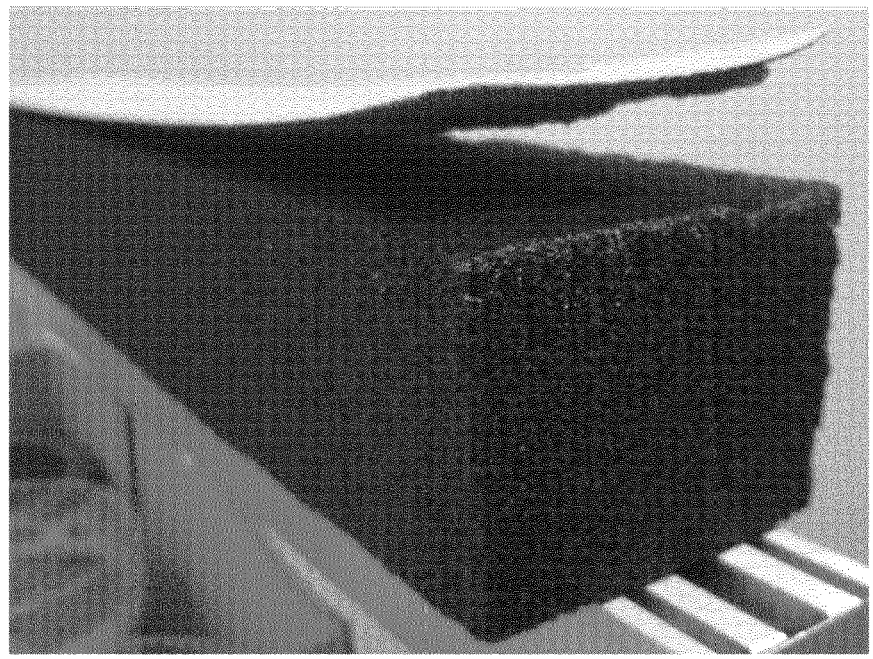
FIG. 1. is a photograph of a prior art sodium silicate coating composition (Comp B) applied to a cellular glass substrate showing poor adhesion of the prior art coating thereto.

Aspects and embodiments of the present invention will now be discussed with reference to the accompanying figures. Further aspects and embodiments will be apparent to those skilled in the art. All documents mentioned in this text are incorporated herein by reference.

Unless otherwise stated the percentages by weight specified for the components in the curable and potassium silicate coatings described herein are calculated based on the total weight of the composition. Moreover, references to weight percentages refer to the % weight by dry mass of the relevant component. That is, the weights are based on the actual weight amount of the component absent any water, such as adsorbed water or water of hydration The present invention provides an aqueous coating composition, a potassium silicate coating formed by curing the aqueous coating composition, and an insulation material substrate with at least one surface coated in a coating formed by curing the aqueous coating composition.

Aqueous Coating Composition

In some embodiments, the aqueous coating composition comprises:
(a) 10 to 40 wt. % of the alkali silicate, the alkali silicate comprising potassium silicate; and
(b) 15 to 60 wt. % of the curing agent; and
(c) at least 15 wt. % of water;
    Wherein the % weight amounts are based on the total weight of the aqueous coating composition.

Alkali Silicate

The aqueous curable coating composition and resulting potassium silicate coating includes alkali silicate. Alkali silicate is a generic name for the group of compounds with the formula $M_{2x}SiO_{2+x}$ or $(M_2O)_x \cdot SiO_2$ where M is an alkali metal. Alkali silicate is also commonly used for a mixture of compounds having the formula above, such that x may typically be non-stoichiometric (in other words, x may not be a whole number). Alkali silicates may be characterised by the weights or the weight ratio of the alkali metal oxide and silica. For example, a composition having 25 wt. % alkali silicate including a 1.5:1 $SiO_2:M_2O$ weight ratio may be expressed as having 10 wt. % $M_2O$ and 15 wt. % $SiO_2$. Alkali silicates may sometimes be referred to "waterglass"

(or "water glass") due to the compounds' solubility in water, although this term traditionally is used for sodium silicate.

The alkali silicate described herein includes potassium silicate. Potassium silicate may be the sole alkali silicate or the alkali silicate may include potassium silicate and one or more alkali silicates. In particular embodiments, the alkali silicate includes potassium silicate and lithium silicate. In some embodiments, the aqueous coating compositions described herein include 10 to 40% by weight of an alkali silicate comprising potassium silicate and lithium silicate. The alkali silicate may contain 5 to 15% by weight of $K_2O$, 0.01 to 1% by weight $Li_2O$; and 5 to 25% by weight of $SiO_2$. In these embodiments, the weight ratio $SiO_2$ to $K_2O$ is typically at least 1.

In particular embodiments, the aqueous coating compositions described herein include 10 to 25% by weight of an alkali silicate. The alkali silicate may contain 5 to 10% by weight of $K_2O$, 0.01% to 0.5% by weight $Li_2O$ and 5 to 15% by weight of $SiO_2$ (these percentages being based on the total weight of the composition). In these embodiments, the weight ratio $SiO_2$ to $K_2O$ is typically at least 1.

Without wishing to be bound by any theory the applicant believes that where the amount of the silicate, $K_2O$ and/or $SiO_2$ ingredients is/are present in the coating composition of the invention in an amount below the lower boundary of their respective broadest range specified herein, then the bonding strength of the coating to the substrate is relatively weaker. On the other hand it is also believed that coating compositions where the amount of silicate, $K_2O$ and/or $SiO_2$ is above the upper boundary of their respective broadest range specified herein, the resulting coating has been observed to exhibit relatively poorer water resistance and leaching of soluble alkali metal silicate ingredients from the composition due to their high concentrations. Similarly it is believed that weight ratios of $SiO_2$ to $K_2O$ lower than the range claimed exhibit relatively lower water resistance due to the higher solubility of the alkali metal silicate components. It is also believed that coating compositions which have an amount of $Li_2O$ below the lower boundary of the broadest range specified for $Li_2O$ herein may form coatings that are relatively less resistant to shearing and deformation.

In these embodiments, the $SiO_2$ to $M_2O$ weight ratio may be in the range of from 1.0:1 to 1.5:1. In some embodiments, the $SiO_2$ to $M_2O$ weight ratio may be in the range of from 1.2:1 to 1.4:1, such as around 1.3:1.

Alkali silicates are commercially available and the weight percentage of the $M_2O$ and $SiO_2$ is typically provided. Where the aqueous coating composition includes a mixture of alkali silicates, such mixtures may be commercially available in the desired relative amounts of alkali silicates or alkali silicates may be mixed in the desired relative amounts. For example, an alkali silicate composition may include 16 to 22% by weight of $K_2O$, such as 19 to 21%, e.g. about 20% by weight and 20 to 30% by weight $SiO_2$, such as 24 to 27%, e.g. about 25 or 26%. The alkali silicate composition may also include 0.05% to 1% by weight $Li_2O$. Typically, an alkali silicate composition also includes water. The water may be present in 40 to 70% by weight of the alkali silicate composition. The alkali silicate composition is then typically diluted with the curing agent and optionally water and/or one or more additives to form the aqueous coating composition described herein.

Curing Agent

The aqueous coating composition of the invention further incorporates at least one curing agent. The curing agent may be any suitable agent that cures composition, such as any curing agent capable of curing the alkali silicate component. It is generally preferred that the curing agent is insoluble in water.

The curing agent as used herein denotes any moiety which is capable of reacting with (or causing a reaction with, e.g. be a catalyst for) a component of the composition, such as the alkali silicate component, in a curable composition of the invention in a curing step to form a potassium silicate coating of the invention.

The curing agent may comprise or be a single agent or comprise a multiple component system. The curing agent may comprise catalysts for curing and/or may comprise precursors for reactive (or more reactive than the precursor) curing agent(s) which can undergo the curing reaction in the curing step. Thus, if necessary, the start of curing can be controlled by generation of one, or a further, curing agent from a precursor curing agent. By this means curing of a curable composition may be prevented or reduced until the curable composition is ready for use (e.g. coated onto a substrate) and the shelf-life of the curable composition can be prolonged. The curable composition of the invention may comprise one or more inhibitors (e.g. free radical inhibitors and/or antioxidants) which may prevent and/or delay curing until the inhibitors are removed and/or deactivated (e.g. by heating). The time taken for curing may be selected according to the needs of the formulator and/or end user and preferably is chosen to provide a sufficiently long workability time for the curable composition to have properties which allow it to be applied evenly to coat the substrate (preferably an insulating substrate such as a cellular glass material) so it will form a barrier thereon when cured and yet is sufficiently short that the uncured liquid coating composition does not flow from the substrate or is otherwise adversely impacted before the coating can be cured. Curing times can be controlled by controlling the temperature and/or amount of radiation used. The curing step may be catalysed by control of pH, for example by use of acid catalysts and/or by control of the amount of water present and/or by control of the amount of oxygen (or air) present.

Preferred curing agents are any known in the art capable of reacting with one or more of potassium silicate, lithium silicate and/or silicon dioxide, optionally in one embodiment by forming a three dimensional network in the potassium silicate coating obtained after curing, more optionally in the same or a different embodiment by forming Si—O bonds.

Examples of suitable curing agents that cure alkali metal silicates include organic acids, acidic phosphate salts and/or weak mineral acids or metal salts. The curing agent(s) may, for example, be an inorganic phosphate, e.g. a metal phosphate. Particularly suitable curing agents are aluminium phosphates, e.g. aluminium metaphosphates. As known to those skilled in the art, the term "aluminium phosphate" covers a range of compounds with differing $P_2O_5$ and $Al_2O_3$ contents. Mixtures of aluminium phosphates of such different compositions may be used. For example, an aluminium phosphate containing about 80% $P_2O_5$ and 20% $Al_2O_3$ may be used. Additionally or alternatively, an aluminium phosphate containing about 60% $P_2O_5$ and about 30% $Al_2O_3$ may be used. In a preferred embodiment, a mixture of an aluminium phosphate containing (i) about 80% $P_2O_5$ and 20% $Al_2O_3$ and (ii) about 60% $P_2O_5$ and 40% $Al_2O_3$ are used. As further understood by those skilled in the art, the higher the $Al_2O_3$ content of the aluminium phosphate the higher the reactivity with silicates. Suitable aluminium phosphate hardeners are available under the trade mark Fabutit®.

In some embodiments, the total amount of curing agent present in the aqueous coating compositions composition may be from 15 to 60% by weight, for instance, 20 to 50% by weight, more particularly 25 to 35% by weight, and even more particularly 26 to 30% by weight of the total aqueous coating composition, such as about 28% by weight. Without wishing to be bound by any theory the applicant has discovered that if the curing agent is present in a coating composition of the invention in amounts below the lower boundary of the broadest range specified for curing agent herein, this will provide potassium silicate coatings which are relatively less resistant to water and thus result in more soluble silicate having a lower water resistance and increased leaching of components from the coating. If the curing agent is present in amounts above the upper boundary of the broadest range specified for curing agent herein, this may lead to coatings that are relatively more susceptible to leaching of curing agent (e.g. phosphate) from the coating, display more efflorescence and/or lead to an increase in coating hygroscopicity.

Water

As described herein, the aqueous coating compositions of the invention comprise water in at least about 15% by weight relative to the weight of the composition. The water may for instance be provided in an amount of at least 20% or 30% by weight. The water may for example be present in an amount of from 40% wt., 50% wt. or 60% wt. Typically, the water is not provided in an amount of more than about 60% by weight.

Curability

It will be understood that aqueous coating compositions of the present invention are typically curable. It will be appreciated that the step of curing will typically involve reacting the alkali silicate of the composition to form internal bonds between the components thereof such that the material obtained after curing has different properties compared to the properties of the curable composition before curing. The curing step will typically generate cross-links within the alkali silicate due to generation of bonds between moieties within the composition to form oligomeric species, polymeric species and/or a three dimensional network. The skilled person will appreciate that alkali silicate can be cured using certain known curing agents, such as those described herein. This will usually result in the formation of Si—O covalent bonds. Optionally, where the curable composition is applied to a substrate surface and cured in situ thereon, in the curing step bonds may be formed between the potassium silicate coating and the substrate to improve the adhesion thereto. Thus in one embodiment of the invention it is especially preferred that the curing agent be capable of causing a reaction between the substrate to which the curable composition is applied (which may comprise, consist essentially of, or preferably consist of a substrate also containing silicate material). The substrate may for instance be cellular glass material. Curing the composition may thus provide improved properties such providing one or more of a water barrier, oxygen barrier, increased hardness, increased abrasion resistance, increased chemical resistance and/or adhesion to any underlying substrate surface to which the curable composition was applied.

Curing can be achieved by any means known to the art, for example inherently by mixing components that trigger a chemical reaction, thermally, or by irradiation (e.g. by ionising radiation optionally in the presence of initiators).

Thermal curing can be achieved by the action of heat from any suitable source which may be used to promote a reaction and/or generate an initiator in situ from the curable composition to initiate the reaction of the curing step. Thermal curing is preferred. Typically this will involve applying heat to the curable composition, most preferably in a two stage process using gentle heating followed by heating at a higher temperature. However, any temperature that initiates a reaction between the curing agent and silicate is suitable.

Alternatively or additionally, curing may be achieved by radiation. Curing by radiation (and related terms) refers to a method of curing by exposing a material to electromagnetic radiation (such as actinic radiation) and/or other ionizing radiation. Radiation curing can be achieved with or without oxygen (air) and/or initiator. Ionizing radiation is electromagnetic radiation (e.g. gamma-rays or X-rays) or particulate radiation (e.g. electron beam (EB)) that is sufficiently energetic to form ions and/or radicals in the irradiated material and thus initiate polymerisation of monomers and/or cross-linking of polymers without adding photo-additive (such as photo-sensitizer and/or photo-initiator). Actinic radiation denotes ultraviolet (UV) or visible light (preferred predominantly in the ultra-violet region) that will initiate substantial cross-linking and/or polymerisation only when irradiation occurs in the presence of photo-additive.

Suitable curing agents for use in the curable compositions of the invention are described herein.

Curable compositions in accordance with the invention are useful for forming protective coatings on a range of substrates by application of the composition to the substrate and effecting curing. The resultant cured coatings demonstrate desirable adhesion to the underlying substrate and have good compressive strength.

In embodiments wherein the potassium silicate coating comprises particulate filler material, the coating may display advantageous barrier properties. For instance, in embodiments wherein a fire resistant particulate is present, the cured material may desirably exhibit a good fire reaction classification as discussed further below. In the case where the particulate is a glass material, the compositions of the invention have particular use in forming protective, optionally fire resistant, coatings on thermally insulating materials, such as cellular glass panels (e.g. of the type available under the trademark Foamglas®).

The compositions may suitably have a degree of elasticity which permits a degree of flexing of the substrate without damage to the cured coating.

Additives

The aqueous coating compositions may include one or more coating additives. In particular embodiments, the coating composition includes one, more than one or all of: a compound of Formula 1 (as described herein), a surfactant and a particulate filler material.

Compound of Formula 1

The curable composition of the invention may comprise 0.2 to 15% by weight of one or more compounds of Formula 1

$$R(OH)_n \qquad \text{Formula 1}$$

wherein R denotes an optionally substituted $C_{2-6}$hydrocarbyl or $C_{2-6}$carbohydrate moiety and n is an integer from 1 to 6.

In embodiments, no more than one compound of formula 1 is provided. The compound(s) of formula 1 are small molecule alcohols. It will be appreciated that compounds of formula 1 are hydrophilic. Hydrophilicity may for example be determined by any suitable parameter such as having a hydrophilic lipophilic balance (HLB) value greater than 10. Such compounds may be provided as "wetting agents" in the compositions of the invention. It will be understood that such compounds typically show at least some degree of miscibility with water. Without wishing to be bound by theory, it is thought that the reason for the advantageous effect observed when providing compounds of Formula 1 is that the compounds may interact with the alkali metal silicate component and/or optionally the particulate component (preferably just the silicate component (a)), in a manner similar to water, for example by hydrogen bonding thereto. The compound(s) of formula 1 typically allow the compositions to dehydrates in a controlled manner (e.g. during curing, e.g. on a substrate surface).

The applicant believes that if the compound(s) of formula 1 are present in a coating composition of the invention in amounts below the lower value of the range specified herein, then once the composition is applied to a substrate, the resulting coating may display less controlled curing and be more prone to becoming inflexible. If the compound(s) of formula 1 are provided in any amount higher than the upper value of the range specified herein, then the resulting coating may be more difficult to dry and also may demonstrate diminished fire resistance.

Preferably the compound(s) of formula I are volatile enough so as to be removed from the composition during or following curing at ambient conditions, upon heating to 30° C., 40° C., 50° C. or 60° C., 70° C. or 80° C.

The terms "hydrocarbo" and "optionally substituted" are defined herein. The term 'hydrocarbo' or 'hydrocarbo group' as used herein denotes a moiety consisting of hydrogen atoms and carbon atoms to which the respective OH group(s) is bonded. The hydrocarbo group may be saturated or unsaturated. It may, for instance, be saturated (e.g. an alkyl group). Alternatively, it may contain one or more double (alkenyl) and/or triple bonds (alkynyl) and/or aromatic groups (e.g. aryl) and where indicated may be substituted with other functional groups.

The hydrocarbo group may contain linear, branched, and/or cyclic sections. The hydrocarbo group may thus be linear, branched, or cyclic. In an embodiment, the hydrocarbo group is linear and acyclic (e.g. in the case of glycerine). In another embodiment, the hydrocarbon group is branched and acyclic (e.g. in the case of pentaerythritol).

In an embodiment, the optionally substituted $C_{2-6}$ hydrocarbo is optionally substituted $C_{2-4}$ hydrocarbo, such as $C_2$-hydrocarbo, $C_3$-hydrocarbo, $C_4$-hydrocarbo or $C_6$-hydrocarbo. The optionally substituted $C_{2-6}$ hydrocarbo may be optionally substituted $C_3$-hydrocarbo or $C_6$-hydrocarbo, e.g. $C_3$-hydrocarbo. In embodiments, the optional substituents may be selected from one or more of amino, thiol, carboxy, $C_{1-4}$ alkoxy and cyano groups. Typically, the hydrocarbo group is not substituted.

The term "carbohydrate" denotes a moiety consisting of hydrogen atoms, oxygen atoms, and carbon atoms to which the respective OH group(s) is bonded. Examples are ethers, acetals and hemi acetals. The carbohydrate may for instance be a saccharide, such as a simple sugar, e.g. glucose or fructose. The group may be saturated or unsaturated. It may, for instance, be saturated. Alternatively, it may contain one or more double and/or triple bonds and where indicated may be substituted with other functional groups. The carbohydrate group may contain linear, branched, and/or cyclic sections. The carbohydrate group may thus be linear, branched, or cyclic.

Formula 1 represents a mono-ol when n is 1, and a polyol when n is >1. In embodiments, n is 1. Alternatively, n may be 2. Alternatively, n may be 3. Alternatively, n may be 4. Alternatively, n may be 5. Alternatively, n may be 6. Typically n is from 2 to 5, e.g. 3 or 4. In embodiments, n is from 2 to 5 (e.g. 3 to 4) and R is a $C_2$-$C_5$hydrocarbo group (e.g. a $C_3$-$C_5$hydrocarbo group), and in particular embodiments is a $C_2$-$C_5$alkyl group, e.g. a $C_3$-$C_5$alkyl group. The alkyl group may be selected from n-propyl, i-propyl, n-butyl, t-butyl, i-butyl, n-pentyl, t-pentyl, neopentyl, isopentyl, sec-pentyl, 3-pentyl, sec-isopentyl. When n is 3, the compound of formula 1 is typically glycerine. When n is 4, the compound of formula 1 is typically pentaerythritol. The compound of Formula 1 may thus be selected from the group consisting of glycerine and pentaerythritol, e.g. glycerine.

The total amount of the compound(s) of formula 1 that may be present in the curable composition of the invention is from 0.2 to 15% based on the total weight of components (a) to (e). In embodiments, the compound(s) of formula 1 are present in an total amount of from 0.1 to 10%, such as from 0.2% to 8%, or 0.5% to 5%, for instance 1% to 3%, e.g. 1.5% to 2.5% by weight based on the total weight of the composition.

The compound(s) of formula 1 may be one or more diol(s) and/or triol(s), usefully one or more triol(s). Advantageously the polyol(s) may be $C_{2-5}$ polyol(s), more advantageously $C_{2-4}$ polyol(s). In one particularly preferred embodiment of the invention component (d) comprises, preferably consists essentially of, most preferably consists of a propanetriol, for example glycerine (i.e. 1,2,3-trihydroxypropane, also known as glycerol) and/or pentaerythritol.

The total amount of the polyol(s) of component (d) that may be present in the composition is in an amount of from 0.2 to 8%, conveniently from 0.5% to 5%, more conveniently from 1% to 3%, most conveniently 1.5% to 2.5% by weight based on the total weight of the composition.

Where glycerine and/or pentaerythritol are used as the compound of formula 1, the glycerine and/or pentaerythritol may in embodiments be present in the composition in an amount of from 0.5% to 5%, by weight based on the total weight of the composition.

The hydrocarbo or carbohydrate group may be substituted or unsubstituted, such as unsubstituted. Typically, substitution refers to the notional replacement of a hydrogen atom with a substituent group, or two hydrogen atoms in the case of substitution by =O or =NR, etc. When a particular group is substituted, there will generally be substitution by 1 to 5 substituents, such as 1 to 3 substituents, for instance 1 or 2 substituents, e.g. 1 substituent.

Unless indicated otherwise herein, the optional substituent(s) may be independently OH, $NH_2$, halogen, trihalomethyl, trihaloethyl, $-NO_2$, $-CN$, $-N^+(C_{1-6}alkyl)_2O^-$, $-CO_2H$, $-CO_2C_{1-6}alkyl$, $-SO_3H$, $-SOC_{1-6}alkyl$, $-SO_2C_{1-6}alkyl$, $-SO_3C_{1-6}$ alkyl, $-OC(=O)OC_{1-6}alkyl$, $-C(=O)H$, $-C(=O)C_{1-6}alkyl$, $-OC(=O)C_{1-6}$ alkyl, =O, $-N(C_{1-6}alkyl)_2$, $-C(=O)NH_2$, $-C(=O)N(C_{1-6}alkyl)_2$, $-N(C_{1-6}alkyl)/(=O)O(C_{1-6}$ alkyl), $-N(C_{1-6}alkyl)C(=O)N(C_{1-6}alkyl)_2$, $-OC(=O)N(C_{1-6}$ alkyl$)_2$, $-N(C_{1-6}alkyl)C(=O)C_{1-6}$ alkyl, $-C(=S)N(C_{1-6}$ alkyl$)_2$, $-N(C_{1-6}alkyl)C(=S)C_{1-6}$ alkyl, $-SO_2N(C_{1-6}$ alkyl$)_2$, $-N(C_{1-6}alkyl)SO_2C_{1-6}$ alkyl, $-N(C_{1-6}$ alkyl)C(=S)N(C_{1-6}$ alkyl$)_2$, $-N(C_{1-6}alkyl)SO_2N(C_{1-6}$ alkyl$)_2$, $-C_{1-6}alkyl$, $-C_{1-6}$ heteroalkyl, $-C_{3-6}$ cycloalkyl, $-C_{3-6}$ heterocycloalkyl, $-C_{2-6}alkenyl$, $-C_{6-14}aryl$, $-C_{6-14}heteroaryl$, $-C_{2-6}heteroalkenyl$, $-C_{3-6}cycloalkenyl$, $-C_{3-6}heterocycloalkenyl$, $-C_{2-6}alkynyl$, $-C_{2-6}heteroalkynyl$, $-Z^u-C_{1-6}alkyl$, $-Z^u-C_{3-6}cycloalkyl$, $-Z^u-C_{2-6}$ alkenyl, $-Z^u-C_{3-6}cycloalkenyl$, $-Z^u-C_{2-6}alkynyl$, or $-Z_u-C_{1-6}alkylaryl$ wherein $Z^u$ is independently O, S, NH or N($C_{1-6}$ alkyl).

Exemplary optional substituent(s) is/are independently halogen, trihalomethyl, trihaloethyl, $-NO_2$, $-CN$, $-N^+(C_{1-6}$ alkyl$)_2O^-$, $-CO_2H$, $-SO_3H$, $-SO_2C_{1-6}$ alkyl, $-C(=O)H$, $-C(=O)C_{1-6}alkyl$, =O, $-N(C_{1-6}alkyl)_2$, —C(=O)NH$_2$, —C$_{1-6}$ cycloalkyl, —C$_{3-6}$ heterocycloalkyl, —Z$^u$C$_{1-6}$alkyl or —Z$^u$—C$_{3-6}$cycloalkyl, wherein Z$^u$ is defined above.

If the optional substituent represents an oxy moiety to which two optionally substituted hydrocarbyl moieties are attached then optionally substituted R represents an ether moiety. Preferred optional substituents comprise: carboxy, carbonyl, oxy, amino, and/or methoxy.

Surfactant

The aqueous curable coating compositions may further comprise a surface active agent. It is understood that this may improve the wetting properties of the composition as a coating to a substrate and also adhesion of the composition to the substrate. The surface active agent is preferably present in an amount of 0.01% to 0.5% by weight, more preferably 0.1% to 0.2% by weight. Optionally in one embodiment the surface active agent may be a low foaming surface active agent. Suitable low foaming surface active agents may be selected from those: rated low as determined by the Ross Miles test (ASTM D1173) that produce 5 cm or less of initial foam height or break to less than 5 cm in 2 minutes and/or are rated as non-foaming in the high shear test method (ASTM D3519-88) producing 5 cm or less of foam height. It is particularly preferred that the surface active agent is an amphoteric (zwitterionic) surface active agent, such as amino acid, imidazoline and/or betaine type surfactant.

The amphoteric surface active agent may be selected from surface active agents which are pH sensitive, more usefully those that exhibit cationic properties in acidic conditions (low pH). Suitable examples include N-alkyl betaines and/or hydroxyl-imidazolines. Most preferred surface active agents are: alkali metal (preferably sodium) caprylo amphopropionates, such as sodium 3-[2-(2-heptyl-4,5-dihydro-1H-imidazol-1-yl)ethoxy] propionate).

Particulate Filler Material

The compositions of the invention may optionally contain a particulate filler material (f). The particulate filler material is typically inert and/or acts as a filler material. The particulate filler material may be generally inert under the conditions of use of the composition (e.g. unreactive with the silicate component (a) or the curing agent (b). The particulate filler material may be a filler, i.e. typically inexpensive compared to the other components of the coating composition of the invention.

In a preferred embodiment of the invention, the particulate filler material is fire resistant. Such embodiments are thus eminently suitable for use as a fire resistant coating for surfaces/substrates. Once cured onto the respective surface, coatings formed from such compositions can display a good fire reaction classification. The fire reaction classification may be determined according to the test presented herein. The skilled person will be able to determine the relative amount of fires resistant particulate required in order to impart a good fire reaction classification. Suitable amounts are described below. The particulate may, for example, be an inorganic, mineral or ceramic particulate. Particular examples of particulates include glass (e.g. obtained by milling), clay, sand and volcanic tuff (e.g. Trass).

It is desirable that the particulate filler material be provided in an amount that provides suitable viscosity and shearing resistance of the coating from a given surface to which it is applied. Without wishing to be bound by theory, the applicant has observed that overloading the composition with too much particulate filler material can lead to weaker coatings and/or coatings that are relatively more difficult to handle due to increased viscosity. Irrespective of the nature of particulate filler material, if present it is present in the composition in an amount of 20 to 30% by weight, preferably 22 to 28% by weight and more preferably 24 to 26% by weight based on the total weight of the composition.

The particulate filler material may be dispersed, suspended, dissolved and/or otherwise distributed in the composition. The optional particles, where present, are preferably insoluble in water. In particular embodiments, the particulate filler material is inert to the other components of the aqueous coating composition and/or the insulation substrate material at ambient and curing conditions. Ambient condition as used herein is the temperature and relative humidity of the surrounding air. In this way, the particulate filler material may not chemically react with the other components in the composition, coating or insulation material.

In particular embodiments, the particulate filler material is glass. In further particular embodiments, the particulate filler material is powder from cellular glass. For example, the particulate filler material may include Foamglas® particles. The powder from cellular glass is typically ground to provide the desired particles.

In some embodiments, the filler material has a thermal expansion coefficient in the range of 50-150% of the thermal expansion coefficient of the insulation material, whereby the filler has a bulk density of at least 0.30 kg/dm$^3$.

Where the insulation material has a cell structure, the particulate filler material may have a thermal expansion coefficient in the range of 50-150% of the thermal expansion coefficient of the cell wall material of the insulation material.

In an embodiment of the present invention, the thermal expansion coefficient of the filler is at least 55% of the thermal expansion coefficient of the insulation material, at least 60%, at least 65%, at least 70%, at least 75%, at least 80%, at least 85%, at least 90%, or more particularly at least 95% of the thermal expansion coefficient of the cell wall material of the insulation material.

In an embodiment of the present invention, the thermal expansion coefficient of the filler is at most 145% of the thermal expansion coefficient of the insulation material, at most 140%, at most 135%, at most 130%, at most 125%, at most 120%, at most 115%, at most 110%, or more particularly at most 105% of the thermal expansion coefficient of the cell wall material of the insulation material.

In a particular embodiment, the particulate filler material has a thermal coefficient in the range of 90 to 110% of the thermal expansion coefficient of the insulation material. In further particular embodiments, the particulate filler material has substantially the same thermal expansion coefficient as the thermal expansion coefficient of the insulation material. In this way, shearing issues may be avoided, resulting in good compatibility between the coating and the insulation material substrate. Such compatibility may be demonstrated by placing the coated insulation material in a climate chamber, in which the samples are exposed to climate cycles according to the ETAG004—norm. In this way, no significant deterioration may occur when both particulate filler and insulation material have the same or similar thermal expansion coefficient.

The thermal expansion coefficient is measurable according to the thermal mechanical analysis known as TMA.

In an embodiment of the present invention, the filler has a bulk density of at least 0.33 kg/dm$^3$, at least 0.35 kg/dm$^3$, at least 0.38 kg/dm$^3$, at least 0.40 kg/dm$^3$, at least 0.42 kg/dm$^3$, at least 0.44 kg/dm$^3$, at least 0.46 kg/dm$^3$, at least 0.48 kg/dm$^3$, at least 0.50 kg/dm$^3$, or more particularly at least 0.52 kg/dm$^3$.

In an embodiment of the present invention, the filler has a tap density of at least 0.35 kg/dm³, at least 0.38 kg/dm³, at least 0.40 kg/dm³, at least 0.42 kg/dm³, at least 0.44 kg/dm³, at least 0.46 kg/dm³, at least 0.48 kg/dm³, at least 0.50 kg/dm³, at least 0.52 kg/dm³, at least 0.54 kg/dm³, at least 0.56 kg/dm³, at least 0.58 kg/dm³, or more particularly at least 0.60 kg/dm³.

In the context of the present invention, with bulk density is meant the "freely settled" or "poured" density of a particulate material, i.e. the density which is measured without any extra action to compact the material in its container other than pouring the particulate material into the container, usually a cylindrical container carrying volume gradations. This is in contrast with the so-called "tap density", i.e. the bulk density of a particulate material that is measured after submitting the container to a compaction process, usually involving vibration of the container or tapping the container a number of times on a table top, readily 10-20 times, until the particulate material is visually observed to not compact any further.

In particular embodiments, the particulate filler material comprises the same material as the insulation material. In a particular embodiment, the particulate filler material is the same material as the insulation material.

Particle Size and Shape

In a particular embodiment the alkali silicate and/or the optional particle filler material (more particularly the optional particular filler material) have an average particle size of from 20 to 500 microns, for example of from 30 to 250 microns, such as from 50 to 200 microns. The particles may have a d90 of less than 300 microns.

In another embodiment conveniently the alkali silicate and/or the optional particle filler material (more conventionally the optional particular filler material) have a particle size distribution (PSD) such that the average particle size may be any of those values given herein and more conveniently has a mono or bi modal distribution.

In a further embodiment usefully the particulate filler material and/or alkali silicate particles comprise at least 50% by weight of substantially non-spherical particles, such as having a flaked shape, optionally with an aspect ratio (major to minor axis) of at least 1.5, more optionally from 1.5 to 10, and for example with a thickness of about 10 microns.

In particular embodiments, the aqueous coating composition comprises:
  (a) 10 to 40% by weight of an alkali silicate comprising potassium silicate and lithium silicate in amounts of:
    5 to 15% by weight of $K_2O$;
    0.01 to 1% by weight $Li_2O$; and
    5 to 25% by weight of $SiO_2$;
    and the weight ratio of $SiO_2$ to $K_2O$ is at least 1; and
  (b) 15 to 60% by weight of a curing agent; and
  (c) 0.1 to 15% by weight of one or more compounds of Formula 1

$$R(OH)_n \qquad \text{Formula 1}$$

wherein
    R denotes an optionally substituted $C_{2-6}$ hydrocarbyl or $C_{2-6}$ carbohydrate moiety and n is an integer from 1 to 6; and
  (d) 0.02 to 0.8% by weight of surfactant relative to the total weight of the composition; and
  (e) at least 15% by weight of water;
  wherein the % wt amounts are based on the total weight of the aqueous coating composition.

These embodiments of the aqueous coating composition may further comprise a particulate filler material, optionally wherein the particulate filler material is present in an amount of from 20 to 30 wt % relative to the total weight of the composition.

In one embodiment, the aqueous coating composition may comprise:
  (a) 10 to 25% by weight of an alkali silicate comprising potassium silicate and lithium silicate in amounts of:
    5 to 10% by weight of $K_2O$;
    0.01 to 0.5% by weight $Li_2O$; and
    5 to 15% by weight of $SiO_2$;
    and the weight ratio of $SiO_2$ to $K_2O$ is at least 1,
  (b) 20 to 50% by weight of a curing agent,
  (c) 0.1 to 10% by weight of one or more compounds of Formula 1

$$R(OH)_n \qquad \text{Formula 1}$$

wherein
    R denotes an optionally substituted $C_{2-6}$ hydrocarbyl or $C_{2-6}$ carbohydrate moiety and n is an integer from 1 to 6;
  (d) 0.01 to 0.5% by weight of surfactant relative to the total weight of the composition; and
  (e) at least 15% by weight of water; and
  (f) 20 to 30% by weight of a particulate filler material,
wherein all % by weight amounts specified are relative to the total weight of the composition.

Method of Making Aqueous Coating Compositions

Compositions in accordance with the invention may be produced by blending all of the components in the required amount using conventional mixing techniques. It is however particularly preferred initially to formulate a modified silicate composition comprising lithium silicate, potassium silicate, glycerine, the surface active agent and water in the first instance. The modified silicate composition may subsequently be admixed with the curing agent and optionally particulate filler material, preferably wherein the curing agent and particulate filler material are water insoluble. The modified silicate composition may itself be prepared by initially blending together solutions of potassium silicate and lithium silicate (optionally in water) followed by addition of the compound of formula (I) (i.e. the hydrophilic agent, e.g. glycerine) and surfactant. An exemplary method is described in the examples that follow.

Potassium Silicate Coating

A potassium silicate coating containing potassium silicate is described herein. The potassium silicate coating may form a coating or an adhesive coating.

The potassium silicate coating may comprise 20 to 65 wt. % alkali silicate based on the total weight of the cured coating and the alkali silicate comprises potassium silicate. In particular embodiments, the coating includes 20 to 65 wt. % alkali silicate comprising potassium silicate and lithium silicate. In further embodiments, the potassium silicate coating comprises 20 to 65% by weight of a silicate component comprising potassium silicate and lithium silicate in amounts of 10 to 32% by weight of $K_2O$, 0.05 to 1% by weight $Li_2O$, and 10 to 32% by weight of $SiO_2$, the weight ratio of $SiO_2$ to $K_2O$ is at least 1, where all % by amounts are based on the total weight of the potassium silicate coating.

In some embodiments, the potassium silicate coating is obtained by or obtainable by curing an aqueous coating composition as describe herein.

In particular embodiments, the potassium silicate coating is obtained by or obtainable by curing an aqueous coating composition, the composition comprising:

(a) 10 to 40 wt. % of the alkali silicate, the alkali silicate comprising potassium silicate; and
(b) 15 to 60 wt. % of the curing agent; and
(c) at least 15 wt. % of water;

Wherein the % weight amounts are based on the total weight of the aqueous coating composition.

In more particular embodiments, the potassium silicate coating is obtained by or obtainable by curing an aqueous coating composition, the composition comprising:
(b) 10 to 40% by weight of an alkali silicate comprising potassium silicate and lithium silicate in amounts of
5 to 15% by weight of $K_2O$;
0.01 to 1% by weight of $Li_2O$; and
5 to 25% by weight of $SiO_2$;
and the weight ratio of $SiO_2$ to $K_2O$ is at least 1; and
(b) 15 to 60% by weight of a curing agent; and
(c) 0.1 to 15% by weight of one or more compounds of Formula 1

$$R(OH)_n \quad \text{Formula 1}$$

wherein
R denotes an optionally substituted $C_{2-6}$ hydrocarbyl or $C_{2-6}$ carbohydrate moiety and n is an integer from 1 to 6; and
(d) 0.02 to 0.8% by weight of surfactant; and
(e) at least 15% by weight of water;
wherein the % wt amounts are based on the total weight of the aqueous coating composition.

The aqueous coating composition of these embodiments of the potassium silicate coating may further comprise a particulate filler material, optionally wherein the particulate filler material is present in an amount of from 20 to 30 wt % relative to the total weight of the composition.

In one embodiment, the potassium silicate coating is obtained by or obtainable by curing an aqueous coating composition, the composition comprising:
(a) 10 to 25% by weight of a silicate component comprising potassium silicate and lithium silicate in amounts of:
5 to 10% by weight of $K_2O$;
0.01 to 0.5% by weight of $Li_2O$; and
5 to 15% by weight of $SiO_2$;
and the weight ratio of $SiO_2$ to $K_2O$ is at least 1,
(b) 20 to 50% by weight of a curing agent,
(c) 0.1 to 10% by weight of one or more compounds of Formula 1

$$R(OH)_n \quad \text{Formula 1}$$

wherein
R denotes an optionally substituted $C_{2-6}$ hydrocarbyl or $C_{2-6}$ carbohydrate moiety and n is an integer from 1 to 6;
(d) 0.01 to 0.5% by weight of surfactant relative to the total weight of the composition; and
(e) at least 15% by weight of water; and
(f) 20 to 30% by weight of a particulate filler material,
wherein all % by weight amounts specified are relative to the total weight of the composition.

In some embodiments, the potassium silicate coating has a substantially uniform surface.

When the potassium coating is used as the insulation material coating described herein, the coating may have a surface roughness less than the surface roughness of the surface of the insulation material on which the coating is situated. More particularly, the coating may occupy and/or fill opened surface cells when the insulation material has a cellular structure, for example, when the insulation material substrate is made of cellular glass. In this way, the coating may provide a good finish to the insulation material.

In alternative embodiments, the coating may be used as an adhesive. For example, the coating may be an adhesive layer between a first insulation material substrate and a second substrate. The second substrate may be a second insulation material substrate. The first and second insulation material substrate may be made of the same insulation material or from different insulation materials. In alternative embodiments, the second substrate is not an insulation material substrate. The use of the coating as an adhesive layer to adhere different material substrates together may result in a solid final structure with very high bonding strength between the substrates.

Curing can be achieved by any means known to the art, for example, by mixing components that inherently trigger a chemical reaction, thermally, or by irradiation (e.g. by ionising radiation optionally in the presence of initiators). Curing, as described above, may be employed to obtain the potassium silicate coating.

Volatile components in the aqueous coating composition (e.g. certain compounds of Formula I described herein), when present, may evaporate during or after curing. These components may not be incorporated into the potassium silicate coating. Other components in the aqueous coating composition (e.g. certain particulate filler material described herein), when present, will remain in the composition after curing. These components may be incorporated into the potassium silicate coating.

The additional and alternative features described herein with respect to the aqueous coating composition may also be additional and alternative features of the potassium silicate coating, where compatible.

Coated Insulation Material

A coated insulation material having an insulation material substrate and a coating (referred to herein as "the insulation material coating") on at least part of one surface of the insulation material substrate is described herein.

Insulation Material Coating

The insulation material coating comprises 20 to 65 wt. % alkali silicate based on the total weight of the cured coating and the alkali silicate comprises potassium silicate. In particular embodiments, the coating includes 20 to 65 wt. % alkali silicate comprising potassium silicate and lithium silicate.

In particular embodiments, the insulation material coating is the potassium silicate coating as described herein. In more particular embodiments, the coating on the insulation material substrate is obtained by or obtainable by curing the aqueous coating composition as described herein.

In particular, the insulation material coating may be obtained by or obtainable by curing an aqueous coating composition comprising:
(a) 10 to 40 wt. % of the alkali silicate, the alkali silicate comprising potassium silicate; and
(b) 15 to 60 wt. % of the curing agent; and
(c) at least 15 wt. % of water;

Wherein the % weight amounts are based on the total weight of the aqueous coating composition.

Curing can be achieved by any means known to the art, for example, by mixing components that inherently trigger a chemical reaction, thermally, or by irradiation (e.g. by ionising radiation optionally in the presence of initiators). Curing, as described above, may be employed to obtain the insulation material coating.

Volatile components in the aqueous coating composition (e.g. certain compounds of Formula I described herein), when present, may evaporate during or after curing. These components may not be incorporated into the insulation material coating. Other components in the aqueous coating composition (e.g. certain particulate filler material described herein), when present, will remain in the composition after curing. These components may be incorporated into the insulation material coating.

The additional and alternative features described herein with respect to the aqueous coating composition and potassium silicate coating may also be additional and alternative features of the insulation material coating, where compatible.

Insulation Material Substrate

The insulation material substrate may be made from any insulating material. The aqueous coating composition and potassium silicate coating described herein may form a potassium silicate coating on any suitable insulation material.

In particular embodiments, the insulation material substrate is selected from the group consisting of expanded polystyrene (EPS), extruded polystyrene (XPS), foamed polyurethane (PU), expanded polyisocyanurate (PIR), urea formaldehyde foam insulation, spray foam insulation (e.g. Icynene® foam, a two component PU foam composition that may be sprayed shortly or immediately after mixing the A (isocyanate) and B (polyol containing) components on-site), expanded perlite foam, cellular concrete, also known as aerated concrete, lightweight aerated concrete, variable density concrete, foam concrete, e.g. the so-called "aerated concrete", for instance Multipor® or Ytong®, or aerated autoclave concrete, and cellular ceramic materials, such as cellular glass.

In some embodiments, the insulation material has a closed cell structure. In other words, the insulation material substrate includes a number of cells comprising cell walls of insulation material and cell interiors of a different material. Typically, the cell interiors are composed of a gas, such as air, $N_2$ and/or $CO_2$. At the surface of a closed cell structure insulation material substrate, the substrate may include open cells. The open cells may be formed from part of a closed cell. For example, the open cells may be created where a closed cell is formed and then the substrate is cut through the closed cell to form the surface. Alternatively, the open cell may be formed where there is insufficient cell wall insulation material to form a closed cell. When the insulation material substrate includes open cells at the coated surface, the coating may occupy some or all of the open cell structure on the surface. In this way, satisfactory adhesion of the coating and the insulation material substrate may be provided.

In particular embodiments, the insulation material substrate is cellular glass insulation substrate, also known as glass foam material (e.g. FOAMGLAS® material). This insulation material is, factory made, compliant with standards EN 13167, EN 14305, ASTM C552. Cellular glass may readily offer a thermal conductivity of less than 0.065 W/m·K, a compressive strength of at least 0.4 N/mm², and complies with a class A1-fire reaction, meaning it is non-combustible.

In another embodiment, the insulation material substrate has a cellular structure with an average cell diameter in the range of 0.1-5.0 mm, preferably at least 0.2 mm, more preferably at least 0.3 mm, even more preferably at least 0.4 mm, yet more preferably at least 0.5 mm. In an embodiment the average cell diameter is at most 4.0 mm, preferably at most 3.0 mm, more preferably at most 2.5 mm, even more preferably at most 2.0 mm, yet more preferably at most 1.7 mm.

The applicants determine the average cell diameter d of a cellular product according to the following procedure. A sample comprising a 10×10 cm area of the surface to be coated should be taken from the insulation material. The sample should be taken from the centre of the insulation material, i.e. at maximum distance of each border.

The cells of the foamed product are about spherical when they are formed, ideally taking a tetrakaidecahedral form, i.e. a regular 3D shape delimited by 8 hexagonal face and 6 quadrilateral faces. When the cell is cut, its cross-section would be about circular. Several effects during the insulation material manufacturing process, may result in elongation or deformation of the cells in one or more directions. The cell cross sections may thus deviate from about circular, forming a shape with a longer axis being perpendicular to a shorter axis.

Cell diameters should be measured on the surface to be coated, preferably under a microscope, with an optical magnification of at least 20×. In such a microscopic view or picture, when in doubt, may be determined an average cell diameter in a first direction giving about the highest diameter, and the average cell diameter in a second direction which is perpendicular to the first direction. A ratio of the two average cell diameters may then be determined by dividing the smallest average cell diameter by the largest one.

In the context of the present invention, the average cell diameter d of a sample of cellular ceramic material should be determined in a plane coinciding with the surface to be coated. The average cell diameter "d" should be determined by counting how often a section of a straight line of at least 3.0 cm long crosses a cell wall on a microscope picture. If the microscope picture is not large enough to host a 3.0 cm line section, several microscope pictures may need to be stitched together using appropriate software in order to obtain a microscopic picture representing a cellular ceramic sample of at least 3.0 cm long. The average cell diameter is then computed using formula (I):

$$d=L/(0.785^2*N)=L/(0.616*N) \qquad (I)$$

wherein
 d is the average cell diameter (in mm, with 10 micrometers significance or better)
 L is the length of the line section crossing the cell walls in the microscope picture (expressed in mm, but measured to an accuracy of 10 micrometers or better), and
 N is the number of times the line section intersects cell walls along its length L. In the context of the present invention, this number should be at least 40, else a longer line needs to be selected, or additional measurements (additional lines whose intersections are counted) need to be performed on another part of the sample that has no cells in common with the first line(s).

The factor 0.785 is computed as the rounded result of π/4, conform what is described in Appendix X1 of ASTM D3576-15, i.e. the relation between the average chord length and the average cell diameter. The factor 0.616 is the square of the factor 0.785 rounded to the same precision.

In the context of the present invention, a cell wall is defined as the material boundary separating two cells. However, bubbles may be present in a cell wall. If a line crosses a bubble, the cell wall surrounding the bubble should be counted as one cell wall, not two. A cell is therefore defined in the context of the present invention as a void having more than 3 neighbours. A cell usually has a non-spherical geometry, because "corners" are formed where three cells meet each other. Ideally the shape of a cell is a tetrakaidecahedron, or related. A bubble has only 3 or less neighbours and is typically almost fully spherical or ellipsoid in shape, usually having no "corners".

For elongated cells, the cell may be conceived as an ellipsoid rather than a sphere. The measurement stated above should be performed in two directions: once along the predominant long axis of the cells, and once along the predominant short axis of the cells. Applying formula (I) will give the length of the long axis (a) for the former measurement, and the length of the ellipsoid short axis (b) for the latter. An equivalent circular diameter can then be computed as $$d=\sqrt{(a*b)}$$

Typically, this measurement is repeated at least once, more particularly at least twice, even more particularly at least three times, yet more particularly at least 5 times on the same surface of the sample, the line sections being drawn at different locations on the sample surface, at least 2*d (with d as defined in formula I) apart from each other. The inventors typically work with a sample having a 10×10 cm surface area of the surface to be coated. The inventors typically divide the sample surface to be used for the cell diameter determination into 9 areas of about the same size by drawing a rectangular raster on the surface which divides each surface border in 3 parts of about the same size. The single central area is then labelled A, the 4 side areas bordering the area A are labelled B, and the 4 remaining corner areas are labelled C. The inventors typically draw one line section having the length L in each of the 9 areas. The inventors typically use all 9 measurements. For simplicity, the measurements for areas A and B may be used, or if sufficiently differentiating the result for area A only, but the inventors consider the combination of the 9 measurements as the ultimately governing result. The individual results di of each of the n individual measurements should then be averaged mathematically over all n measurements, in order to obtain the average cell diameter d for the sample.

In some embodiments, the insulation material substrate has a solid space representing at least 2% and at most 10% of the slab volume, preferably at least 3%, more preferably at least 4%. In one embodiment, the insulation material substrate has a solid space representing at most 9% of the slab volume, particularly at most 8%, more particularly at most 7% and even more particularly at most 6%. The applicants have found that limiting the solid space of the insulation to at most the upper limit as specified, contributes to the excellent insulating properties of the insulation material substrate.

Method of Producing the Coated Insulation Material

The method of producing the coated insulation material as described herein is not particularly limited.

In particular embodiments, a method of producing a coated insulation material substrate comprises the steps of:
(i) Providing an aqueous coating composition as described herein;
(ii) Applying the composition to at least one surface of an insulation material substrate; and
(iii) initiating curing of the composition.

The above method may lead to good adhesion between the resulting insulation material coating and the insulation material substrate.

Steps (ii) and (iii) of may be performed sequentially or simultaneously. The method may be part of a continuous process or a batch process.

In some embodiments, steps (ii) and (iii) are performed sequentially in a continuous process, with step (ii) occurring before step (iii) in the process.

The composition may be applied in step (ii) in any suitable way. For example, the composition may be applied by a method selected from spraying, roller coating, scraping, submerging, and the waterfall method.

Step (iii) may include drying the coating on the insulation material substrate at a temperature in the range of 20 to 100° C. In some embodiments, the coating is dried at a temperature in the range of 40 to 80° C. In a particular embodiment, the coating is dried at a temperature in the range of 50 to 70° C. In a further embodiment, the coating is dried at a temperature of about 60° C.

The drying step may be particularly performed for a sufficiently long time period for obtaining a substantially full curing of the coating. For instance, drying at 16° C. may be performed for a period of in the range of 3 to 6 hours. Drying at 20° C. may be performed for a period in the range of 2.5 to 6 hours. Drying at 40° C. may be performed for a period in the range of 60 to 120 minutes. Drying at 60° C. may be performed for a period of in the range of 30 to 90 minutes. Drying at 80° C. may be performed for a period in the range of 15 to 60 minutes. Drying at 100° C. may be performed for a period in the range of 2 to 30 minutes. In a particular embodiment, the drying step is performed around 60° C. for at least 60 minutes and optionally up to about 90 minutes. In this way, the composition may be sufficiently cured, provide a satisfactory finish to the coating and may be an acceptable time period for the industrial production process.

The drying of the coating may be performed in a drying tunnel. The drying may include applying infrared radiation to the surface of the insulation material substrate coated with the composition.

In some embodiments, step (ii) is performed at least twice. In a particular embodiment, step (ii) is performed twice. In these embodiments, step (ii) may be performed at least twice before step (iii) is performed or step (ii) may be repeated after step (iii) is performed for the first time. The composition form the first application may be at least partially cured before the second or subsequent application of the composition to the insulation material substrate. In this way, the insulation material substrate may have a surface with two layers of the potassium silicate coating.

In some embodiments, the coated insulation material resulting from the method described herein is maintained under controlled conditions of temperature and/or relative humidity for a period of time to allow for curing to continue.

In some embodiments, the method further comprises a step of washing the coated insulation material after step (iii). The step of washing may use water to wash the coated insulation material. The water may have a pH in the range of 6 to 8.

Alternatively, a method of producing a coated insulation material substrate comprises the steps of:
(i) Providing an aqueous coating composition as described herein;
(ii) initiating curing of the composition to form a potassium silicate coating; and then
(iii) applying the potassium silicate coating to at least one surface of an insulation material substrate.

In these alternative embodiments, an adhesive may be included between the potassium silicate coating and the insulation material substrate.

In some embodiments, the methods described herein further comprise a step of painting, varnishing, applying enamel and/or applying tiles to the coating of the coated insulation material.

Curing can be achieved by any means known to the art, for example, by mixing components that inherently trigger a chemical reaction, thermally, or by irradiation (e.g. by ionising radiation optionally in the presence of initiators). Curing, as described above, may be employed in these methods of producing the coated insulation material.

Volatile components in the aqueous coating composition (e.g. certain compounds of Formula I described herein), when present, may evaporate during or after curing. These components may not be incorporated into the insulation material coating of the coated insulation material. Other components in the aqueous coating composition (e.g. certain particulate filler material described herein), when present, will remain in the composition after curing. These components may be incorporated into the insulation material coating of the coated insulation material.

The additional and alternative features described herein with respect to the aqueous coating composition and potassium silicate coating may also be additional and alternative features of the method of producing the coated insulation material, where compatible.

Kit of Parts

Described herein is a kit for providing a coated insulation material substrate, the kit comprising at least one insulation material substrate to be coated and an aqueous coating composition as described herein in sufficient quantity to provide a coating on at least part of one surface of the insulation material substrate.

In particular embodiments, the aqueous coating composition comprises:
(a) 10 to 40 wt. % of the alkali silicate, the alkali silicate comprising potassium silicate;
(b) 15 to 60 wt. % of the curing agent; and
(c) at least 15 wt. % of water;
Wherein the % weight amounts are based on the total weight of the aqueous coating composition.

In a more particular embodiment, the aqueous coating composition comprises:
(a) 10 to 25% by weight of a silicate component comprising potassium silicate and lithium silicate in amounts of:
5 to 10% by weight of $K_2O$;
0.01 to 0.5% by weight $Li_2O$; and
5 to 15% by weight of $SiO_2$;
and the weight ratio of $SiO_2$ to $K_2O$ is at least 1,
(b) 20 to 50% by weight of a curing agent,
(c) 0.1 to 10% by weight of one or more compounds of Formula 1

$R(OH)_n$  Formula 1 wherein
R denotes an optionally substituted $C_{2-6}$ hydrocarbyl or $C_{2-6}$ carbohydrate moiety and n is an integer from 1 to 6;
(d) 0.01 to 0.5% by weight of surfactant relative to the total weight of the composition; and
(e) at least 15% by weight of water; and
(f) 20 to 30% by weight of a particulate filler material,
wherein all % by weight amounts specified are relative to the total weight of the composition.

In alternative embodiments, a kit for providing a coated insulation material substrate is described herein, the kit comprising at least one insulation material substrate to be coated and a potassium silicate coating as described herein in sufficient quantity to provide a coating on at least part of one surface of the insulation material substrate.

In this alternative embodiment, the potassium silicate coating may comprise 20 to 65 wt. % alkali silicate based on the total weight of the cured coating and the alkali silicate comprises potassium silicate.

In particular, the potassium silicate coating may be obtained by or obtainable by curing an aqueous coating composition comprising:
(a) 10 to 40 wt. % of the alkali silicate, the alkali silicate comprising potassium silicate; and
(b) 15 to 60 wt. % of the curing agent; and
(c) at least 15 wt. % of water;
Wherein the % weight amounts are based on the total weight of the aqueous coating composition.

The additional and alternative features described herein with respect to the aqueous coating composition, potassium silicate coating and insulation material substrate may also be additional and alternative features of the kit of parts, where compatible.

Building Material

Also described herein is a building material comprising a coated insulation material substrate as described herein.

The building material may in particular be an insulating panel. Such insulation panels are used for insulating, for example, walls, roofs and floors of a building. Alternatively, insulation panels are used for industrial insulation, such as for pipes and tanks.

The building material may be substantially planar or may be curved. The building material may form a substantially flat insulating panel. Alternatively, the building material may form a curved, sleeve, sheath or tubular insulating panel.

The building material may include a single coated insulation material as described herein. The building material may include a coated insulation material as described herein and an additional insulation material substrate adjacent to the insulation material coating. In other words, the insulation material coating may be sandwiched between two insulation material substrates.

In particular embodiments, the two insulation material substrates are in direct contact with the insulation material coating. In more particular embodiments, the building material is formed by coating an aqueous coating composition as described herein onto at least part of a surface of an insulation material substrate, then a second insulation material substrate is contacted with the aqueous coating composition, and then the composition is cured.

In particular, one or more insulation material substrates in the building material are cellular glass substrates, such as Foamglas®.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example+/−10%.

Test Methods

Unless otherwise indicated all the tests herein are carried out under standard conditions as also defined herein.
Particle Size Particle sizes and particle size distributions as referred to herein are by weight and are determined using a Malvern Mastersizer 2000 equipped with the sample dispersion unit 25 Hydro 2000S (supplied by Malvern Instruments Ltd., UK).
Standard (or Ambient) Conditions As used herein, unless the context indicates otherwise, standard or ambient conditions as used herein means, atmospheric pressure, a relative humidity of 50%±5%, ambient temperature (22° C.±2°) and, if an air flow is present, an air flow of less than or equal to 0.1 m/s. Unless otherwise indicated all the tests herein are carried out under standard conditions as defined herein.
Bonding Strength (Tensile Strength)

Bonding strength of cured coating compositions according to the invention to a substrate (cellular glass) were tested. For each coating composition to be tested three parallelepipeds of respective dimensions (length (L)×width (W)×thickness (T)) of 150 mm×150 mm×80 mm were prepared to determine the bonding strength between a cellular glass panel substrate (available under the trade mark Foamglas®). The coating composition to be tested is applied to the surface of each parallelepiped (further details of the coating are provided in the tables and examples below). Test specimens are prepared from the coated parallelepipeds by adhering the 150×150 mm (original main block) surfaces of the coated substrates to preheated (+80° C.) tensile plates by means of hot melt bitumen R85/25 heated to around 180° C. Afterwards the test specimens are gradually cooled down to ambient temperature. The test specimens are conditioned (aged) for a period of time at +23° C. and approximately 50% RH. This ageing period may be overnight or in examples (such as in the tables below) may be for a number of months. The conditioned (aged) specimens are then tested (at +23° C.) for tensile strength in accordance with EN1607 (Determination of tensile strength perpendicular to faces) with a test speed of 10 mm/min on a TONIVERSAL 20 kN equipment (class 1 as per DIN 51220). A chain system is used to improve the alignment of the specimen to avoid uneven distribution of tensile stress during the test. Data generated from this test is provided in the tables and examples below.

The data in tables 5 and 6 show that the coating compositions of the invention show good tensile strength as the coating layer resists delamination from the surface of the cellular glass panel.
Compressive Strength For each coating composition to be tested, four samples are prepared of a cellular glass panel substrate (available under the trade mark Foamglas®) with respective panel dimensions (L×W×T) of ~200 mm×~200 mm×80 mm, to form a test specimen which are used to evaluate the compressive behaviour of the coated substrate. Further details of the coating are provided in the tables and examples herein. These specimen are then tested (@+23° C.) for compressive strength (with a bitumen capping on both sides) on TONIVERSAL 400 kN equipment (class 1 as per DIN 51220). Data generated from this test is provided in the tables and examples below.

The data in tables 7 and 8 show that the coating compositions of the invention have good compressive strength, as failure in these tests arises from deformation of the underlying cellular glass panel rather than failure of the coating.
Point Load Resistance Crushing penetration on the coated surface of the assembly can be measured in accordance with industry standard EN12430.
Water Absorption For each coating composition to be tested three 200×200 mm specimen are prepared of a cellular glass panel substrate (available under the trademark Foamglas®) coated with the coating composition to be tested (further details of the coating may be provided in the tables and examples herein). These specimen are then tested (@+23° C.) for initial, short term and long term water absorption by partial immersion in accordance with EN1609, method B (with deduction of initial water uptake if less than 0.5 kg/m²). The initial mass at the start of the test (denoted $m_0$) is determined and then the test specimen is placed in a water bath in such position that the side coated with the coating composition to be tested is partially immersed in water with the bottom face of the test specimen 10±2 mm below the water level.

After 10 s, the test specimen was removed from the bath, held horizontally and within 5 seconds placed in a plastic tray of known mass. This allows the initial uptake of water (denoted $m_1$) to be determined. The test specimen was again placed in the water bath, partially immersed (to a depth of 10±2 mm). The water level was kept at a constant level during this test. After 24 hours the test specimen was removed from the bath and the mass of water absorbed after 24 hours ($m_{24}$) determined which provides the short term water absorption (Short term WA). After 28 days the long term water absorption (Long term WA) may also be determined in a similar manner by partial immersion in accordance with EN 12087, method B. Data generated from this test is provided in the tables and examples herein.

The data in table 9 show that the coating compositions of the invention resist water absorption providing a good potassium silicate coating and thus improving the weather resistance of the cellular glass panels on which they are coated.

Fire Behaviour/Fire Resistance

To evaluate the behaviour of coatings when subject to fire, coated specimens are cut from samples of coated substrates of size 90 mm wide×190 mm long. The test specimens have a maximum thickness of 60 mm with a minimum of 6 specimens being used for each exposure condition tested. The test specimens are subjected to the single-flame-source test (ISO 11925-2 2010) for determining the ignitability of products by direct small flame impingement under zero impressed irradiance using vertically oriented test specimens. The test is performed inside a test chamber with the vertically mounted test specimen subjected to edge and surface exposure from a gas flame for 15 seconds, after which the flame is removed and the test is continued to observe any resultant ignition. Results from these tests are given herein in table 10. Most of the substrates to which the coating is applied are known cellular glass panels which are typically fire resistant when uncoated.

The term "fire resistant" as used herein denotes that the coated specimen prepared from a coating and tested as described above is deemed to have passed the criteria set out in ISO 11925-2 2010 which are that during the duration of the test either no ignition occurs; or if ignition occurs the flame tip does not reach 150 mm above the flame application point on the specimen and no burning droplets are produced. For non-coated materials (such as precursor curable coating compositions and/or components thereof) "fire resistant" as used herein denotes that when said material is used as a coating or component thereof to form a coated specimen tested as described above, the coated specimen is or remains fire resistant (e.g. if the uncoated substrate is already fire resistant in the same test). Fire resistance may be due to the inherent properties of the fire resistant material and/or how the material is incorporated into a protective coating to impart fire resistance. Uncoated cellular glass is known to have a high degree of fire resistance.

The data below show that certain tested coating compositions of the invention are fire resistant.

Fire behaviour of the assembly was tested in accordance with industry standards EN 13820:2003, EN ISO 1716:2010 and EN ISO 1182. The results obtained following EN ISO1716 all resulted in a classification of "non combustible" in accordance with class A according to EN 13501-1 and EN ISO 1182 and EN ISO 1716.

Solar Radiation Resistance (UV Testing)

A test specimen of the assembly measuring 300×200×50 mm) was subjected to a UV-aging test in a QUV-SPRAY apparatus (UVA-lamps, 60 minutes light, 9 minutes light plus rain, air-temperature+50° C.), to evaluate the weathering (UV+Rain) resistance.

EXAMPLES

The invention will be illustrated with reference to the following non-limiting Examples. The Examples conveniently fall into three categories.

Comp A is a prior art organic top coating which was used to impart water resistance to cellular glass panels. Whilst these coatings bind well to the panel, this coating is not fire resistant and thus neither are the panels coated with them.

Comp B is a prior art inorganic coating comprising sodium silicate which in theory might impart fire resistance to a cellular glass panel. However the coating has poor cohesive adhesion to the panel as the coating readily delaminates and cannot be tested.

Examples 1 to 4 are coating compositions of the invention which are used to coat cellular glass panels to impart a water and fire resistant coating to the panels. The coating is also durable, binding well to the panels and resisting deformation or delamination.

Comparative Example A (Comp A)

A known organic coating composition which has been used to coat cellular glass panels to provide a potassium silicate coating for vapour is a two component butyl rubber elastomer available from Foamglas under the trade designation PittStop 196 Vapor (also used as a sealant for cryogenic insulation). However this rubber coating is not fire resistant.

Comparative Example B (Comp B)

A known inorganic coating composition comprising sodium silicate with heat resistance of up to 1500° C. is applied (as a sealing paste) to cellular glass panels of the trade name Foamglas®. The sodium silicate-based coating composition was obtained commercially from Soudal in Belgium under the trade designation Calofer. The Calofer coating was applied to coat the surface of a cellular glass substrate at a typical coating thickness used to provide fire resistance. The Calofer coating was allowed to cure at room temperature.

The coating film was found to separate from the cellular glass surface (see FIG. 1). Testing of this coating was therefore discontinued as the coating did not adhere to the substrate sufficiently.

Example 1

The production of a composition in accordance with the invention was performed employing a multi stage process. This example describes the first step. In the first stage, a silicate composition (Ex 1) was produced from the following ingredients shown in Table 1. In particular, a composition containing 90.7% silicate component and 9.3% water was provided. The 90.7% silicate component was composed of the relative amounts of $K_2O$, $Li_2O$ and $SiO_2$ in the dry mass weights shown in table 1.

TABLE 1

| Ingredient (trade name) | $K_2O$ % wt | $Li_2O$ wt % wt | $SiO_2$ wt % wt | Tot dry solids (DS) | Mole ratio (MR) ($M_2O$ to $SiO_2$) | Water % wt |
|---|---|---|---|---|---|---|
| Ex 1 (silicate comp.) | 19.2% | 0.2% | 25.5% | 45.0% | 2.01 | Balance to 100% |

Where $M_2O$ denotes $Li_2O$ and $K_2O$, and molecular weight of $K_2O$ is 94.2, $Li_2O$ is 29.88 and $SiO_2$ is 60.08.

Example 2

This example describes the second stage of the multi-step process mentioned in example 1. In the second stage, to the above silicate composition (Ex 1) additional organic components were added (4.7% weight of glycerine and 0.6% weight of sodium capryloamphopropionate available commercially from Croda under the trade name Crodateric™ CYAP-LQ-(AP) also known as CYAP) as shown in Table 2, to form a modified silicate composition (referred to as "Ex 2"). Water content is not expressly described in the table below but it will be appreciated that the remaining weight balance of the components in the composition is made up by water.

1.5 mm or 3 mm). All samples showed good binding/tensile strength (since all failures have been found to occur in the Foamglas® substrate rather than the coating.

Compressive strength testing of the slabs coated with the coating composition of Example 1 gave average values

TABLE 2

| Ingredient | Relative Ratio | % wt of total ingredients | | | | | Total dry solids (DS) | MR (SiO$_2$/M$_2$O) |
| --- | --- | --- | --- | --- | --- | --- | --- | --- |
| | | K$_2$O | Li$_2$O | SiO$_2$ | Glycerine | Crodateric ™ | | |
| Ex 1 (mod sil.) | 94.7% | 19.2 | 0.2 | 25.5 | — | — | 45.0% | 2.01 |
| Glycerine | 4.7% | — | — | — | 85.6 | — | 85.6% | |
| CYAP | 0.6% | — | — | — | — | 45.0% | 45.0% | |
| Ex 2 | 100.0% | 18.2% | 0.2% | 24.2% | 4.0% | 0.3% | 46.9% | |

Example 3

A coating compositions "Ex 3.1 and 3.2" (also referred to below as "modified silicate") made in accordance with the invention were produced by adding to the composition of Ex 2 curing agent (Fabutit®) and particulate material (ground powder cellular glass). The relative amounts of the respective components in the resulting composition Ex 3.1 and Ex 3.2 are described below in table 3.

TABLE 3

Figure 2:
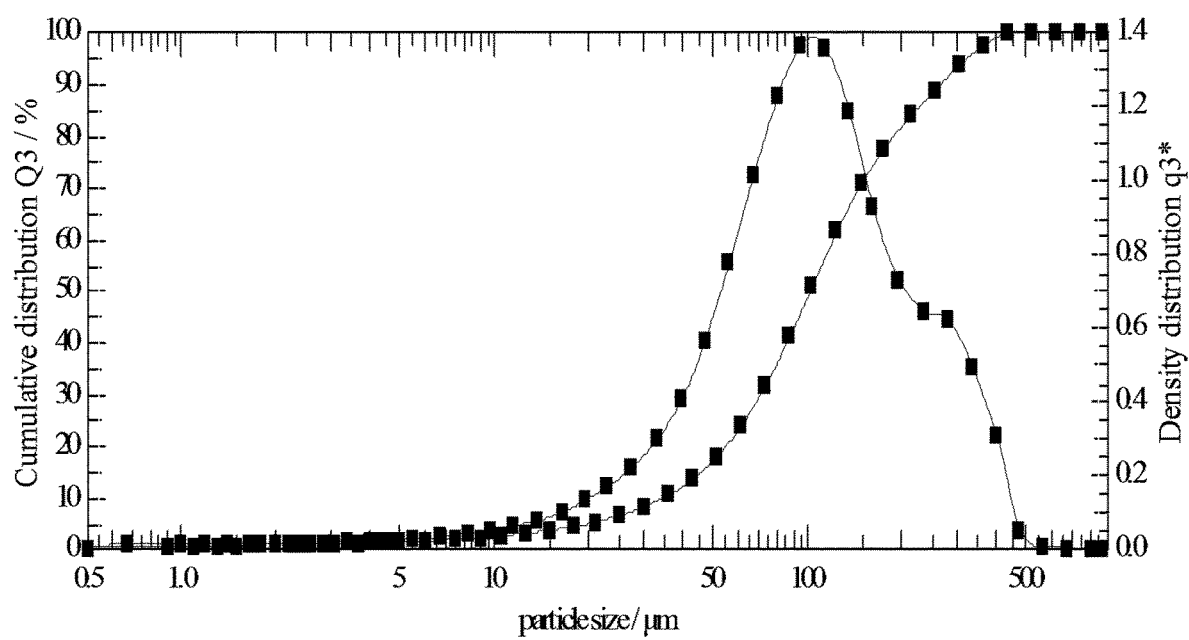
FIG. 2. is a plot of the particulate size distribution of the coating of Example 4.

| Modified silicate | Ex 3.1 wt/% | Ex 3.2 wt/% |
| --- | --- | --- |
| Ex 2 | 47 | 50 |
| Fabutit ® 206 | 19 | 30 |
| Fabutit ® 748 | 9 | 0 |
| Filler | 25 | 20 |
| Total | 100 | 100 |

Where Fabutit® 206 (79% P$_2$O$_5$ and 20% Al$_2$O$_3$); Fabutit® 748 (60% P$_2$O$_5$ and 36% Al$_2$O$_3$); Filler denotes particulate glass material from the production of Foamglas® panels and has a particulate size distribution shown in FIG. 2.

The resulting % wt amounts of the independent components are as shown below in table 4.

TABLE 4

| Component | Ex 3.1 Weight % | Ex. 3.2 Weight % |
| --- | --- | --- |
| SiO$_2$ | 11.37% | 12.10% |
| K$_2$O | 8.54% | 9.10% |
| Li$_2$O | 0.11% | 0.10% |
| Glycerine | 1.90% | 2.00% |
| Crodateric ™ CYAP-LQ-(AP) | 0.12% | 0.15% |
| Water | 24.96% | 26.55% |
| Fabutit ® 206 | 19.00% | 30.00% |
| Fabutit ® 748 | 9.00% | 0 |
| Filler | 25.00% | 20.00% |
| Total | 100.00% | 100.00% |

In Example 3.1 the SiO$_2$/K$_2$O mass ratio is 1.33 and SiO$_2$/M$_2$O mass ratio is 1.31 (where M$_2$O=K$_2$O+Li$_2$O).

The resulting coating formulation was applied to slabs of cellular glass available under the trade mark Foamglas® T4+ to form an even coating thereon and then cured. The amount of the composition applied to the slab was such as to provide an average thickness of coating after drying and curing as specified in the respective Tables below (typically above 600 kPa which indicates that the compressive strength of coating is stronger than the slabs.

Examples 4 and 5

Besides the coating formulation of Ex 3, mixtures have been made with two modified formulas (Ex 4 and Ex 5) for which part of the Fabutit® curing agent has been replaced by TRAS (finely crushed volcanic rock). The coating composition is easy to apply and shows a self-levelling effect. By slightly changing the formula of Ex 3.1 and adding about 5% TRAS in place of the corresponding amount of Fabutit® curing agent, the composition could be applied to the cellular glass surface. Samples were prepared with different average coverages ranging between 1 kg/m$^2$ (about 0.6 mm) and 2.4 kg/m$^2$ (about 1.5 mm). Most of the samples were cured at lab ambient conditions (about +23° C. and 50% RH), but some were subjected to accelerated curing, by placing them immediately after application to the cellular glass surface in an oven at +40° C.

Performance Data

Tensile Strength Tests

The results in the following tables (Tables 5 to 10) show that a coating of the invention applied at different thickness and tested under various environmental conditions has a better tensile or compressive strength than cellular glass panels (Foamglas® T4+) onto which they are applied as in most tests the cellular glass panel (CGP) fails before the coating. This is indicative of the good mechanical and protective properties of the coating of the invention.

The data in table 5 compare the difference in tensile strength for different thicknesses of coating composition (1.5 mm and 3 mm respectively) under either ambient or extreme treatment conditions.

TABLE 5

Tensile test of coatings of the invention on a Foamglas ®T4+

| Sample | Ageing | Tensile strength | Failure mode |
| --- | --- | --- | --- |
| 1.5 mm thick coat of Ex 3.1 | 2 months at lab ambient conditions | 163 kPa | 100% failure of cellular glass panel (CGP) |
| | | 161 kPa | 100% failure of CGP |
| | | 165 kPa | 100% failure of CGP |
| 3 mm thick coat of Ex 3.1 | 2 months at lab ambient conditions | 114 kPa | 100% failure of CGP |
| | | 176 kPa | 100% failure of CGP |
| | | 174 kPa | 100% failure of CGP |

TABLE 5-continued

Tensile test of coatings of the invention on a Foamglas ®T4+

| Sample | Ageing | Tensile strength | Failure mode |
|---|---|---|---|
| 1.5 mm thick coat of Ex 3.1 | 80 cycles +70° C./Rain 8 cycles −20/+50° C. | 194 kPa<br>236 kPa<br>118 kPa | 100% failure of CGP<br>100% failure of CGP<br>100% failure of CGP |
| 3 mm thick coat of Ex 3.1 | 80 cycles +70° C./Rain 8 cycles −20/+50° C. | 206 kPa<br>166 kPa<br>190 kPa | 100% failure of CGP<br>100% failure of CGP<br>100% failure of CGP |

The data in table 6 show the difference in tensile strength for 1 mm coatings formed from either Ex 3 (glass particles) or Ex 4 or Ex 5 (crushed volcanic rock particles in place of some curing agent—see above).

TABLE 6

Tensile test of coatings of the invention on Foamglas ®T4+

| Sample | Ageing | Tensile str | Failure mode |
|---|---|---|---|
| 1 mm thick coat of Ex 3.1 | 1 month at lab ambient conditions | 186 kPa<br>144 kPa<br>153 kPa<br>119 kPa | 100 failure of CGP<br>100% failure of CGP<br>100% failure of CGP<br>100% failure of CGP |
| Average | | 151 ± 24 kPa | |
| 1 mm thick coat of Ex 4 | 1 month at lab ambient conditions | 198 kPa<br>212 kPa<br>171 kPa<br>170 kPa | 100% failure of CGP<br>100% failure of CGP<br>100% failure of CGP<br>100% failure of CGP |
| Average | | 188 ± 18 kPa | |
| 1 mm thick coat of Ex 5 | 1 month at lab ambient conditions | 127 kPa<br>124 kPa<br>161 kPa<br>217 kPa | 100% failure of CGP<br>100% failure of CGP<br>100% failure of CGP<br>100% failure of CGP |
| Average | | 157 ± 37 kPa | |

Compressive Strength

The data in table 7 compare the difference in compressive strength for different thicknesses of coating composition (1.5 mm and 3 mm of Ex 3.1 respectively) under ambient treatment conditions.

TABLE 7

Compressive strength test of coatings of the invention on Foamglas ®T4+

| Sample | Ageing | Compr. str | Failure mode |
|---|---|---|---|
| 1.5 mm thick coat of Ex 3.1 | 2 months at lab ambient conditions | 580 kPa<br>750 kPa<br>660 kPa<br>440 kPa | Cohesive failure in cellular glass<br>Cohesive failure in cellular glass<br>Cohesive failure in cellular glass at interface with coating<br>Cohesive failure in cellular glass at interface with coating |
| Average | | 603 ± 112 kPa | |
| 3 mm thick coat of Ex 3.1 | 2 months at lab ambient conditions | 590 kPa<br>830 kPa<br>460 kPa<br>540 kPa | Cohesive failure in cellular glass<br>Cohesive failure in cellular glass<br>Cohesive failure in cellular glass at interface with coating<br>Cohesive failure in cellular glass at interface with coating |
| Average | | 604 ± 138 kPa | |

The data in table 8 show the difference in compressive strength for ~1 mm coatings formed from either Ex 3.1 (glass particles), Ex 4 or Ex 5 (crushed volcanic rock particles in place of some curing agent—see above).

TABLE 8

Compressive strength test on foamglas ®T4+ substrate with coatings of the invention

| Sample | Ageing | Compr. str | Failure mode |
|---|---|---|---|
| 1.2 mm thick coat of Ex 3.1 | 1 month at lab ambient conditions | 550 kPa<br>260 kPa<br>250 kPa<br>370 kPa | 100% cellular glass failure<br>Cohesive failure in cellular glass at interface with coating<br>Cohesive failure in cellular glass at interface with coating<br>Cohesive failure in cellular glass at interface with coating |
| Average | | 358 ± 121 kPa | |
| 1 mm thick coat of Ex 4 | 1 month at lab ambient conditions | 260 kPa<br>260 kPa<br>340 kPa<br>320 kPa | Cohesive failure in cellular glass at interface with coating<br>Cohesive failure in cellular glass at interface with coating<br>Cohesive failure in cellular glass at interface with coating<br>Cohesive failure in cellular glass at interface with coating |
| Average | | 295 ± 36 kPa | |
| 1 mm thick coat of Ex 5 | 1 month at lab ambient conditions | 240 kPa<br>310 kPa<br>220 kPa<br>490 kPa | Cohesive failure in cellular glass at interface with coating<br>Cohesive failure in cellular glass at interface with coating<br>Cohesive failure in cellular glass at interface with coating<br>100% cellular glass failure |
| Average | | 315 ± 106 kPa | |

Point Load

The point load according to EN 12430 was measured for Foamglas®T4+substrate with a coating according to Ex 3.1 and is less than 0.2 mm, which is the lowest value which can be measured.

Water Absorption

The results in the following table (Table 9) show that a coating of the invention provides a good potassium silicate coating which resists water absorption as shown by the measurement of short and long term water absorption (WA) by partial immersion of the different Foamglas® samples coated with coating compositions of the invention.

TABLE 9

| Sample | Ageing | Average short term WA (kg/m$^2$) (n = 3) | Average long term WA (kg/m$^2$) (n = 3) |
|---|---|---|---|
| 1.5 mm thick coat of Ex 3.1 | aged at lab ambient | 0.13 kg/m$^2$ | 0.30 kg/m$^2$ |
| 3 mm thick coat of Ex 3.1 | aged at lab ambient | 0.14 kg/m$^2$ | 0.36 kg/m$^2$ |
| 1.5 mm thick coat of Ex 3.1 | thermal ageing in PVP | 0.15 kg/m$^2$ | 0.31 kg/m$^2$ |
| 3 mm thick coat of Ex 3.1 | thermal ageing in PVP | 0.20 kg/m$^2$ | 0.37 kg/m$^2$ |

Fire Resistance

The results in the following table (Table 10) show that a coating of the invention imparts fire resistance to Foamglas® samples coated with coating compositions of the invention.

TABLE 10

Reaction to Fire Test (EN ISO 11925-2, 2010) edge exposure (n = 3) (coating Ex 3.1)

|  | Edge exposure | Surface exposure |
| --- | --- | --- |
| Flame application time | 15 s | 15 s |
| Burning droplets | No | No |
| Height burnt cone | 1 cm | 3 cm |

The coating can classify as an A fire classification according to the European norm EN 13501-1 as shown by the results in Table 11.

TABLE 11

| Coating composition used | A Ex 3.1 | B Ex 3.2 |
| --- | --- | --- |
| ΔT (° C.) | 8.9 | 3.7 |
| $t_f$ (s) (4) | 0 | 0 |
| PCS (MJ/kg) | 0.2378 | 0.2378 |

Solar Radiation Resistance (UV Testing)

A test specimen of Foamglas®T4+substrate with a coating according to Ex 3.1 measuring (300×200×50 mm) was subjected to a UV-aging test in a QUV-SPRAY apparatus (UVA-lamps, 60 minutes light, 9 minutes light plus rain, air-temperature+50° C.), to evaluate the weathering (UV+ Rain) resistance. After a complete test run of 220 cycles the coated sample was inspected visually for its condition (discolouring, cracks, shear). No visual or physical defects were observed.

The following numbered paragraphs set out embodiments of the present invention:

Paragraph 1: A coated insulation material comprising an insulation material substrate and a coating on at least part of a surface of the insulation material substrate and wherein the coating comprises 20 to 65 wt. % alkali silicate based on the total weight of the coating and the alkali silicate comprises potassium silicate.

Paragraph 2: The coated insulation material according to paragraph 1 wherein the insulation material substrate has a closed cell structure.

Paragraph 3: The coated insulation material according to paragraph 2 wherein the insulation material has one or more open cells at a surface of the substrate and the coating occupies some or all of open cell.

Paragraph 4: The coated insulation material according to paragraph 2 or paragraph 3 wherein the insulation material substrate is cellular glass.

Paragraph 5: The coated insulation material according to any one of paragraphs 1 to 4 wherein the coating includes 20 to 65 wt. % alkali silicate comprising potassium silicate and lithium silicate.

Paragraph 6: The coated insulation material according to any one of the preceding paragraphs wherein the coating further comprises a curing agent.

Paragraph 7: The coated insulation material according to paragraph 6 wherein the curing agent comprises aluminium phosphate.

Paragraph 8: The coated insulation material according to any preceding paragraph wherein the coating further comprises a particulate filler material in an amount of from 20 to 40 wt % relative to the total weight of the coating.

Paragraph 9: The coated insulation material according to paragraph 8 wherein the particulate filler material has a bulk density of 0.3 kg/dm³.

Paragraph 10: The coated insulation material according to paragraph 8 or paragraph 9 wherein the thermal expansion coefficient of the particulate filler is within the range of 50 to 150% of the insulation material.

Paragraph 11: The coated insulation material according to paragraph 10 wherein the particulate filler material has the same thermal expansion coefficient than the insulation material.

Paragraph 12: The coated insulation material according to any one of the preceding paragraphs wherein the coating comprises:
(a) 20 to 65% by weight of an alkali silicate comprising potassium silicate and lithium silicate in amounts of
  10 to 32% by weight of $K_2O$;
  0.05 to 1% by weight $Li_2O$; and
  10 to 32% by weight of $SiO_2$;
  and the weight ratio of $SiO_2$ to $K_2O$ is at least 1; and
(b) optionally 20 to 40% by weight of a particulate filler material;
where all % by amounts are based on the total weight of the potassium silicate coating.

Paragraph 13: A coated insulation material comprising an insulation material substrate and a coating on at least part of a surface of the insulation material substrate and wherein the coating is formed by curing an aqueous coating composition comprising alkali silicate and a curing agent, wherein the aqueous coating composition comprises:
(a) 10 to 50 wt. % of the alkali silicate, the alkali silicate comprising potassium silicate; and
(b) 15 to 60 wt. % of the curing agent; and
(c) At least 15 wt. % of water;
  Wherein the % wt amounts are based on the total weight of the aqueous coating composition.

Paragraph 14: The coated insulation material according to the paragraph 12 wherein the aqueous coating composition comprises:
(a) 10 to 40% by weight of the alkali silicate comprising potassium silicate and lithium silicate in amounts of
  5 to 15% by weight of $K_2O$;
  0.01 to 1% by weight of $Li_2O$; and
  5 to 25% by weight of $SiO_2$;
  subject to the proviso that the weight ratio $SiO_2$ to $K_2O$ is at least 1; and
(b) 15 to 60% by weight of the curing agent; and
(c) 0.1 to 15% by weight of one or more compounds of Formula 1

$R(OH)_n$  Formula 1 wherein
  R denotes an optionally substituted $C_{2-6}$ hydrocarbyl or 02-6carbohydrate moiety and n is an integer from 1 to 6; and
(d) 0.02 to 0.8% by weight of surfactant relative to the total weight of the composition; and
(e) at least 15% by weight of water;
wherein the % wt amounts are based on the total weight of the aqueous coating composition.

Paragraph 15: An aqueous coating composition for coating insulation material substrate comprising:
(a) 10 to 40% by weight of an alkali silicate comprising potassium silicate and lithium silicate in amounts of
  5 to 15% by weight of $K_2O$;
  0.01 to 1% by weight of $Li_2O$; and
  5 to 25% by weight of $SiO_2$;
  and the weight ratio of $SiO_2$ to $K_2O$ is at least 1; and
(b) 15 to 60% by weight of a curing agent; and (c) 0.1 to 15% by weight of one or more compounds of Formula 1

$$R(OH)_n \quad \text{Formula 1}$$

wherein
R denotes an optionally substituted $C_{2-6}$ hydrocarbyl or $C_{2-6}$ carbohydrate moiety and n is an integer from 1 to 6; and
(d) 0.02 to 0.8% by weight of surfactant relative to the total weight of the composition; and
(e) at least 15% by weight of water;
wherein the % wt amounts are based on the total weight of the aqueous coating composition.

Paragraph 16: The aqueous coating composition according to paragraph 15, further comprising a particulate filler material that is present in an amount of from 20 to 30 wt % relative to the total weight of the composition.

Paragraph 17: The aqueous coating composition according to paragraph 16, the composition comprising:
(a) 10 to 25% by weight of a silicate component comprising potassium silicate and lithium silicate in amounts of:
5 to 10% by weight of $K_2O$;
0.01 to 0.5% by weight $Li_2O$; and
5 to 15% by weight of $SiO_2$;
subject to the proviso that the weight ratio $SiO_2$ to $K_2O$ is at least 1,
(b) 20 to 50% by weight of a curing agent,
(c) 0.1 to 10% by weight of one or more compounds of Formula 1

$$R(OH)_n \quad \text{Formula 1}$$

wherein
R denotes an optionally substituted $C_{2-6}$ hydrocarbyl or $C_{2-6}$ carbohydrate moiety and n is an integer from 1 to 6;
(d) 0.01 to 0.5% by weight of surfactant relative to the total weight of the composition; and
(e) at least 15% by weight of water; and
(f) 20 to 30% by weight of a particulate filler material,
wherein all % by weight amounts specified are relative to the total weight of the composition.

Paragraph 18: A kit for providing a coated insulation material, the kit comprising at least one insulation material substrate to be coated and an aqueous coating composition according to any one of paragraphs 14 to 16 in sufficient quantity to provide a coating on at least part of one surface of the insulation material substrate.

Paragraph 19: A method of producing a coated insulation material, the method comprising the steps of:
(i) Providing an aqueous coating compositions wherein the aqueous coating composition according to any one of paragraphs 15 to 17; and
(ii) Applying the composition to at least one surface of an insulation material substrate; and
(iii) initiating curing of the composition.

Paragraph 20: A building material comprising a coated insulation material substrate according to any one of paragraphs 1 to 14 or a coated insulation material substrate obtained by or obtainable by the method according to paragraph 19.

Paragraph 21: The kit according to paragraph 18, the method according to paragraph 19 or the building material according to paragraph 20 wherein the insulation material substrate is cellular glass.

The invention claimed is:

1. A coated cellular glass insulation material comprising a cellular glass insulation material substrate and a coating on at least part of a surface of the cellular glass insulation material substrate, wherein the coating is formed by curing an aqueous coating composition comprising alkali silicate and a curing agent, wherein the aqueous coating composition comprises:
(a) 10 to 50 wt. % of the alkali silicate, the alkali silicate comprising potassium silicate;
(b) 15 to 60 wt. % of the curing agent;
(c) at least 15 wt. % of water; and
(d) 0.1 to 15 wt. % of one or more compounds of Formula 1

$$R(OH)_n \quad \text{Formula 1}$$

wherein R denotes an optionally substituted $C_{2-6}$ hydrocarbyl or $C_{2-6}$ carbohydrate moiety and n is an integer from 1 to 6;
wherein the wt. % amounts are based on the total weight of the aqueous coating composition.

2. The coated insulation material according to claim 1 wherein the aqueous coating composition comprises:
(a) 10 to 40 wt. % of the alkali silicate, the alkali silicate comprising potassium silicate and lithium silicate in amounts of
5 to 15 wt. % of $K_2O$;
0.01 to 1 wt. % of $Li_2O$; and
5 to 25 wt. % of $SiO_2$;
subject to the proviso that the weight ratio $SiO_2$ to $K_2O$ is at least 1;
(b) 15 to 60 wt. % of the curing agent; and
(c) 0.02 to 0.8 wt. % of a surfactant; and
(d) at least 15 wt. % of water;
wherein the wt. % amounts are based on the total weight of the aqueous coating composition.

3. The coated cellular glass insulation material according to claim 1 wherein the curing agent comprises aluminium phosphate.

4. The coated cellular glass insulation material according to claim 1 wherein the aqueous coating composition further comprises a particulate filler material, and the particulate filler material is present in an amount of from 20 to 30 wt. % based on the total weight of the aqueous coating composition.

5. The coated cellular glass insulation material according to claim 4 wherein the particulate filler material meets at least one of the following:
has a bulk density of at least 0.3 kg/dm$^3$; and
the thermal expansion coefficient of the particulate filler is within the range of 50 to 150% of the cellular glass insulation material substrate.

6. A coated cellular glass insulation material comprising a cellular glass insulation material substrate and a cured coating on at least part of a surface of the cellular glass insulation material substrate and wherein the cured coating comprises 20 to 65 wt. % alkali silicate and one or more compounds of Formula 1

$$R(OH)_n \quad \text{Formula 1}$$

wherein R denotes an optionally substituted $C_{2-6}$ hydrocarbyl or $C_{2-6}$ carbohydrate moiety and n is an integer from 1 to 6; wherein the wt. % is based on a total weight of the cured coating and the alkali silicate comprises potassium silicate.

7. The coated cellular glass insulation material according to claim 6 wherein the cured coating further comprises lithium silicate.

8. The coated cellular glass insulation material according to claim 6 wherein the cured coating further comprises a cured curing agent.

9. The coated cellular glass insulation material according to claim 8 wherein the cured curing agent comprises aluminium phosphate.

10. The coated cellular glass insulation material according to claim 9 wherein the cured coating further comprises a particulate filler material in an amount of from 20 to 40 wt. % based on to the total weight of the cured coating.

11. The coated cellular glass insulation material according to claim 10 wherein the particulate filler material has a bulk density of at least 0.3 kg/dm$^3$.

12. The coated cellular glass insulation material according to claim 11 wherein the thermal expansion coefficient of the particulate filler is within the range of 50 to 150% of the cellular glass insulation material substrate.

13. The coated cellular glass insulation material according to claim 12 wherein the particulate filler material has the same thermal expansion coefficient as the cellular glass insulation material substrate.

14. The coated cellular glass insulation material according to claim 6 wherein the cured coating comprises:
(a) 20 to 65 wt. % of an alkali silicate comprising potassium silicate and lithium silicate in amounts of
10 to 32 wt. % of $K_2O$;
0.05 to 1 wt. % of $Li_2O$; and
10 to 32 wt. % of $SiO_2$;
wherein the weight ratio of $SiO_2$ to $K_2O$ is at least 1; and
(b) optionally 20 to 40 wt. % of a particulate filler material;
where the wt. % amounts are based on the total weight of the cured coating.

15. An aqueous coating composition for coating an insulation material substrate comprising:
(a) 10 to 40 wt. % of an alkali silicate comprising potassium silicate and lithium silicate in amounts of
5 to 15 wt. % of $K_2O$;
0.01 to 1 wt. % of $Li_2O$; and
5 to 25 wt. % of $SiO_2$;
wherein the weight ratio of $SiO_2$ to $K_2O$ is at least 1; and
(b) 15 to 60 wt. % of a curing agent; and
(c) 0.1 to 15 wt. % of one or more compounds of Formula 1

$$R(OH)_n \quad \text{Formula 1}$$

wherein R denotes an optionally substituted $C_{2-6}$ hydrocarbyl or $C_{2-6}$ carbohydrate moiety and n is an integer from 1 to 6; and
(d) 0.02 to 0.8 wt. % of a surfactant relative to the total weight of the composition; and
(e) at least 15 wt. % of water;
wherein the wt. % amounts are based on the total weight of the aqueous coating composition.

16. The aqueous coating composition according to claim 15, further comprising a particulate filler material that is present in an amount of from 20 to 30 wt. % based on the total weight of the composition.

17. The aqueous coating composition according to claim 16, the composition comprising:
(a) 10 to 25 wt. % of a silicate component comprising potassium silicate and lithium silicate in amounts of:
5 to 10 wt. % of $K_2O$;
0.01 to 0.5 wt. % of $Li_2O$; and
5 to 15 wt. % of $SiO_2$;
subject to the proviso that the weight ratio of $SiO_2$ to $K_2O$ is at least 1,
(b) 20 to 50 wt. % of a curing agent,
(c) 0.1 to 10 wt. % of one or more compounds of Formula 1

$$R(OH)_n \quad \text{Formula 1}$$

wherein R denotes an optionally substituted $C_{2-6}$ hydrocarbyl or $C_{2-6}$ carbohydrate moiety and n is an integer from 1 to 6;
(d) 0.01 to 0.5 wt. % of a surfactant relative to the total weight of the composition;
(e) at least 15 wt. % of water; and
(f) 20 to 30 wt. % of a particulate filler material,
wherein the wt. % amounts are based on the total weight of the composition.

18. A method of producing a coated cellular glass insulation material, the method comprising the steps of:
(a) providing an aqueous coating composition according to claim 17; and
(b) applying the composition to at least one surface of a cellular glass insulation material substrate; and
(c) initiating curing of the composition.

* * * * *

UNITED STATES PATENT AND TRADEMARK OFFICE
CERTIFICATE OF CORRECTION

| | |
|---|---|
| PATENT NO. | : 12,077,670 B2 |
| APPLICATION NO. | : 17/276556 |
| DATED | : September 3, 2024 |
| INVENTOR(S) | : Els Bleus et al. |

It is certified that error appears in the above-identified patent and that said Letters Patent is hereby corrected as shown below:

On the Title Page

Column 1 Lane 2 Item (72), correct the spelling of Kate Ranieri to:
--- Katye Ranieri ---

Signed and Sealed this
First Day of October, 2024

Katherine Kelly Vidal
*Director of the United States Patent and Trademark Office*